US007026537B2

(12) United States Patent
Ishii

(10) Patent No.: US 7,026,537 B2
(45) Date of Patent: Apr. 11, 2006

(54) MULTIPLEXING SYSTEM FOR DIGITAL SIGNALS FORMATTED ON DIFFERENT STANDARDS, METHOD USED THEREIN, DEMULTIPLEXING SYSTEM, METHOD USED THEREIN COMPUTER PROGRAMS FOR THE METHODS AND INFORMATION STORAGE MEDIA FOR STORING THE COMPUTER PROGRAMS

(75) Inventor: Jun Ishii, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 388 days.

(21) Appl. No.: 10/419,575

(22) Filed: Apr. 21, 2003

(65) Prior Publication Data

US 2003/0196540 A1 Oct. 23, 2003

(30) Foreign Application Priority Data

Apr. 23, 2002 (JP) ............................ 2002-121319

(51) Int. Cl.
*G10H 7/00* (2006.01)
*H04J 3/00* (2006.01)

(52) U.S. Cl. ............................ 84/617; 84/609; 84/610; 84/649; 84/650; 84/655

(58) Field of Classification Search .......... 84/600–602, 84/609–610, 615, 617, 634, 645, 649–650, 84/653, 655, 666

See application file for complete search history.

(56) References Cited

U.S. PATENT DOCUMENTS

| | | | | |
|---|---|---|---|---|
| 5,542,000 | A * | 7/1996 | Semba | 381/61 |
| 5,654,516 | A * | 8/1997 | Tashiro et al. | 84/601 |
| 5,680,512 | A * | 10/1997 | Rabowsky et al. | 704/504 |
| 5,977,468 | A * | 11/1999 | Fujii | 84/609 |
| 6,160,213 | A * | 12/2000 | Arnold et al. | 84/615 |
| 6,462,264 | B1 * | 10/2002 | Elam | 84/645 |
| 6,686,530 | B1 * | 2/2004 | Juszkiewicz et al. | 84/600 |
| 2002/0056358 | A1 * | 5/2002 | Ludwig | 84/738 |
| 2002/0108484 | A1 * | 8/2002 | Arnold et al. | 84/615 |

* cited by examiner

*Primary Examiner*—Marlon T. Fletcher
(74) *Attorney, Agent, or Firm*—Morrison & Foerster LLP

(57) ABSTRACT

A user is fingering a piece of music on an electronic piano in ensemble with the playback of a piece of music recorded in a compact disc; while the user is playing the piece of music, the electronic piano generates MIDI music data codes representative of the fingering, and the MIDI data bits and the audio data codes, which are transmitted from the compact disc player, are multiplexed into a digital composite music data signal; the digital composite music data signal is transmitted through a single digital audio cable to a tone generator module or stored in a memory, and the tone generator module demultiplexes or extracts the MIDI music data codes from the digital composite music data signal; thus, the multiplexing and demultiplexing make the data transmission and recording simple.

21 Claims, 20 Drawing Sheets

| | MSB l(15) | l(14) | l(13) | l(12) | | l(3) | l(2) | l(1) | LSB l(0) | MSB r(15) | r(14) | r(13) | r(12) | | r(3) | r(2) | r(1) | LSB r(0) |
|---|---|---|---|---|---|---|---|---|---|---|---|---|---|---|---|---|---|---|
| · | · | · | · | · | ··· | · | · | · | · | · | · | · | · | ··· | · | · | · | · |
| · | · | · | · | · | ··· | · | · | · | · | · | · | · | · | ··· | · | · | · | · |
| SAMPLE (n) | 0 | 1 | 1 | 0 | ··· | 0 | 1 | 0 | 1 | 1 | 1 | 1 | 0 | ··· | 0 | 1 | 1 | 0 |
| SAMPLE (n+1) | 1 | 0 | 1 | 1 | ··· | 0 | 0 | 0 | 1 | 0 | 1 | 0 | 1 | ··· | 0 | 1 | 1 | 1 |
| SAMPLE (n+2) | 0 | 0 | 1 | 0 | ··· | 0 | 1 | 1 | 1 | 0 | 0 | 1 | 0 | ··· | 1 | 1 | 0 | 1 |
| SAMPLE (n+3) | 0 | 1 | 1 | 0 | ··· | 1 | 0 | 0 | 0 | 1 | 0 | 0 | 0 | ··· | 0 | 0 | 0 | 0 |
| SAMPLE (n+4) | 0 | 1 | 0 | 0 | ··· | 0 | 1 | 1 | 0 | 0 | 1 | 1 | 1 | ··· | 1 | 1 | 1 | 1 |
| SAMPLE (n+5) | 1 | 0 | 0 | 0 | ··· | 1 | 1 | 1 | 0 | 1 | 0 | 0 | 0 | ··· | 0 | 0 | 0 | 0 |
| SAMPLE (n+6) | 1 | 1 | 1 | 0 | ··· | 0 | 0 | 1 | 0 | 0 | 1 | 0 | 1 | ··· | 0 | 1 | 1 | 1 |
| SAMPLE (n+7) | 0 | 1 | 1 | 1 | ··· | 0 | 1 | 0 | 0 | 0 | 1 | 1 | 1 | ··· | 1 | 0 | 1 | 1 |
| SAMPLE (n+8) | 0 | 0 | 0 | 1 | ··· | 1 | 1 | 0 | 0 | 0 | 0 | 0 | 1 | ··· | 1 | 1 | 1 | 1 |
| SAMPLE (n+9) | 0 | 1 | 1 | 0 | ··· | 1 | 0 | 0 | 1 | 1 | 1 | 1 | 0 | ··· | 0 | 0 | 0 | 0 |
| SAMPLE (n+10) | 0 | 0 | 1 | 0 | ··· | 0 | 0 | 0 | 1 | 0 | 0 | 0 | 0 | ··· | 1 | 0 | 0 | 0 |
| SAMPLE (n+11) | 0 | 0 | 0 | 0 | ··· | 0 | 1 | 1 | 1 | 0 | 0 | 1 | 1 | ··· | 0 | 0 | 1 | 0 |
| SAMPLE (n+12) | 1 | 0 | 1 | 0 | ··· | 1 | 1 | 0 | 0 | 1 | 0 | 1 | 0 | ··· | 1 | 1 | 0 | 0 |
| SAMPLE (n+13) | 0 | 1 | 0 | 0 | ··· | 1 | 0 | 0 | 0 | 0 | 1 | 1 | 0 | ··· | 1 | 1 | 0 | 0 |
| SAMPLE (n+14) | 1 | 0 | 0 | 1 | ··· | 0 | 0 | 1 | 0 | 0 | 1 | 1 | 0 | ··· | 1 | 1 | 1 | 1 |
| · | · | · | · | · | ··· | · | · | · | · | · | · | · | · | ··· | · | · | · | · |
| · | · | · | · | · | ··· | · | · | · | · | · | · | · | · | ··· | · | · | · | · |

AUDIO MUSIC DATA CODE L-CHANNEL

AUDIO MUSIC DATA CODE R-CHANNEL

Fig. 3

| | MSB | | | | | | | | | LSB | MSB | | | | | | | | | LSB |
|---|---|---|---|---|---|---|---|---|---|---|---|---|---|---|---|---|---|---|---|---|
| | L(23) | L(22) | | L(9) | L(8) | L(7) | L(6) | | L(1) | L(0) | R(23) | R(22) | | R(9) | R(8) | R(7) | R(6) | | R(1) | R(0) |
| . | . | . | ··· | . | . | . | | ··· | . | . | . | . | ··· | . | . | . | . | ··· | . | . |
| . | . | . | ··· | . | . | . | . | ··· | . | . | . | . | ··· | . | . | . | . | ··· | . | . |
| SMPL. (n) | 0 | 1 | ··· | 0 | 1 | 0 | 0 | ··· | 0 | 0 | 1 | 1 | ··· | 1 | 0 | 0 | 0 | ··· | 0 | 0 |
| SMPL. (n+1) | 1 | 0 | ··· | 0 | 1 | 0 | 0 | ··· | 0 | 0 | 0 | 1 | ··· | 1 | 1 | 0 | 0 | ··· | 0 | 0 |
| SMPL. (n+2) | 0 | 0 | ··· | 1 | 1 | 0 | 0 | ··· | 0 | 0 | 0 | 0 | ··· | 0 | 1 | 0 | 0 | ··· | 0 | 0 |
| SMPL. (n+3) | 0 | 1 | ··· | 0 | 0 | 0 | 0 | ··· | 0 | 0 | 1 | 0 | ··· | 0 | 0 | 0 | 0 | ··· | 0 | 0 |
| SMPL. (n+4) | 0 | 1 | ··· | 1 | 0 | 0 | 0 | ··· | 0 | 0 | 0 | 1 | ··· | 1 | 1 | 0 | 0 | ··· | 0 | 0 |
| SMPL. (n+5) | 1 | 0 | ··· | 1 | 0 | 0 | 0 | ··· | 0 | 0 | 1 | 0 | ··· | 0 | 0 | 0 | 0 | ··· | 0 | 0 |
| SMPL. (n+6) | 1 | 1 | ··· | 1 | 0 | 0 | 0 | ··· | 0 | 0 | 0 | 1 | ··· | 1 | 1 | 0 | 0 | ··· | 0 | 0 |
| SMPL. (n+7) | 0 | 1 | ··· | 0 | 0 | 0 | 0 | ··· | 0 | 0 | 0 | 1 | ··· | 1 | 1 | 0 | 0 | ··· | 0 | 0 |
| SMPL. (n+8) | 0 | 0 | ··· | 0 | 0 | 0 | 0 | ··· | 0 | 0 | 0 | 0 | ··· | 1 | 1 | 0 | 0 | ··· | 0 | 0 |
| SMPL. (n+9) | 0 | 1 | ··· | 0 | 1 | 0 | 0 | ··· | 0 | 0 | 1 | 1 | ··· | 0 | 0 | 0 | 0 | ··· | 0 | 0 |
| SMPL.(n+10) | 0 | 0 | ··· | 0 | 1 | 0 | 0 | ··· | 0 | 0 | 0 | 0 | ··· | 0 | 0 | 0 | 0 | ··· | 0 | 0 |
| SMPL.(n+11) | 0 | 0 | ··· | 1 | 1 | 0 | 0 | ··· | 0 | 0 | 0 | 0 | ··· | 1 | 0 | 0 | 0 | ··· | 0 | 0 |
| SMPL.(n+12) | 1 | 0 | ··· | 0 | 0 | 0 | 0 | ··· | 0 | 0 | 1 | 0 | ··· | 0 | 0 | 0 | 0 | ··· | 0 | 0 |
| SMPL.(n+13) | 0 | 1 | ··· | 0 | 0 | 0 | 0 | ··· | 0 | 0 | 0 | 1 | ··· | 0 | 0 | 0 | 0 | ··· | 0 | 0 |
| SMPL.(n+14) | 1 | 0 | ··· | 1 | 0 | 0 | 0 | ··· | 0 | 0 | 0 | 1 | ··· | 1 | 1 | 0 | 0 | ··· | 0 | 0 |
| . | . | . | ··· | . | . | . | . | ··· | . | . | . | . | ··· | . | . | . | . | ··· | . | . |
| . | . | . | ··· | . | . | . | . | ··· | . | . | . | . | ··· | . | . | . | . | ··· | . | . |
| | DISCRETE VALUE | | | | | EXRA BITS | | | | | DISCRETE VALUE | | | | | EXRA BITS | | | | |
| 16-BITS DATA CODE | l(15) | l(14) | ··· | l(1) | l(0) | | | | | | r(15) | r(14) | ··· | r(1) | r(0) | | | | | |

Fig. 4

| | START | LSB | | | | | | | MSB | STOP |
|---|---|---|---|---|---|---|---|---|---|---|
| | m(0) | m(1) | m(2) | m(3) | m(4) | m(5) | m(6) | m(7) | m(8) | m(9) |
| STATUS BYTE | 0 | 1 | 0 | 0 | 0 | 1 | 0 | 0 | 1 | 1 |
| DATA BYTE 1 | 0 | 1 | 0 | 1 | 0 | 1 | 1 | 0 | 0 | 1 |
| DATA BYTE2 | 0 | 0 | 0 | 1 | 0 | 0 | 1 | 1 | 0 | 1 |

Fig. 6

| | MSB l(15) | l(14) | l(13) | l(12) | | l(3) | l(2) | l(1) | LSB l(0) | MSB r(15) | r(14) | r(13) | r(12) | | r(3) | r(2) | r(1) | LSB r(0) |
|---|---|---|---|---|---|---|---|---|---|---|---|---|---|---|---|---|---|---|
| . | . | . | . | . | ... | . | . | . | . | . | . | . | . | ... | . | . | . | . |
| . | . | . | . | . | ... | . | . | . | . | . | . | . | . | ... | . | . | . | . |
| SMPL (n) | 0 | 1 | 1 | 0 | ... | 0 | 1 | 0 | 1 | 1 | 1 | 1 | 0 | ... | 0 | 1 | 1 | 1 |
| SMPL. (n+1) | 1 | 0 | 1 | 1 | ... | 0 | 0 | 0 | 1 | 0 | 1 | 0 | 1 | ... | 0 | 1 | 1 | 1 |
| SMPL. (n+2) | 0 | 0 | 1 | 0 | ... | 0 | 1 | 1 | 0 | 0 | 0 | 1 | 0 | ... | 1 | 1 | 0 | 1 |
| SMPL. (n+3) | 0 | 1 | 1 | 0 | ... | 1 | 0 | 0 | 0 | 1 | 0 | 0 | 0 | ... | 0 | 0 | 0 | 0 |
| SMPL. (n+4) | 0 | 1 | 0 | 0 | ... | 0 | 1 | 1 | 0 | 0 | 1 | 1 | 1 | ... | 1 | 1 | 1 | 1 |
| SMPL. (n+5) | 1 | 0 | 0 | 0 | ... | 1 | 1 | 1 | 0 | 1 | 0 | 0 | 0 | ... | 0 | 0 | 0 | 0 |
| SMPL. (n+6) | 1 | 1 | 1 | 0 | ... | 0 | 0 | 1 | 1 | 0 | 1 | 0 | 1 | ... | 0 | 1 | 1 | 1 |
| SMPL. (n+7) | 0 | 1 | 1 | 1 | ... | 0 | 1 | 0 | 0 | 0 | 1 | 1 | 1 | ... | 1 | 0 | 1 | 1 |
| SMPL. (n+8) | 0 | 0 | 0 | 1 | ... | 1 | 1 | 0 | 0 | 0 | 0 | 0 | 1 | ... | 1 | 1 | 1 | 1 |
| SMPL. (n+9) | 0 | 1 | 1 | 0 | ... | 1 | 0 | 0 | 0 | 1 | 1 | 1 | 0 | ... | 0 | 0 | 0 | 1 |
| SMPL. (n+10) | 0 | 0 | 1 | 0 | ... | 0 | 0 | 0 | 1 | 0 | 0 | 0 | 0 | ... | 1 | 0 | 0 | 0 |
| SMPL. (n+11) | 0 | 0 | 0 | 0 | ... | 0 | 1 | 1 | 0 | 0 | 0 | 1 | 1 | ... | 0 | 0 | 1 | 1 |
| SMPL. (n+12) | 1 | 0 | 1 | 0 | ... | 1 | 1 | 0 | 0 | 1 | 0 | 1 | 0 | ... | 1 | 1 | 0 | 0 |
| SMPL. (n+13) | 0 | 1 | 0 | 0 | ... | 1 | 0 | 0 | 0 | 0 | 1 | 1 | 0 | ... | 1 | 1 | 0 | 1 |
| SMPL. (n+14) | 1 | 0 | 0 | 1 | ... | 0 | 0 | 1 | 0 | 0 | 1 | 1 | 0 | ... | 1 | 1 | 1 | 0 |
| . | . | . | . | . | ... | . | . | . | . | . | . | . | . | ... | . | . | . | . |
| . | . | . | . | . | ... | . | . | . | . | . | . | . | . | ... | . | . | . | . |

←— DISCRETE VALUE L-CHANNEL —→ ←— DISCRETE VALUE R-CHANNEL —→

MIDI WORD (l(0)) MIDI WORD (r(0))

Fig. 8

* F(28): Validity, F(29): Sub-code, F(30): Channel Status, F(31): Parity

MULTIPLEXING SYSTEM FOR DIGITAL SIGNALS FORMATTED ON DIFFERENT STANDARDS, METHOD USED THEREIN, DEMULTIPLEXING SYSTEM, METHOD USED THEREIN COMPUTER PROGRAMS FOR THE METHODS AND INFORMATION STORAGE MEDIA FOR STORING THE COMPUTER PROGRAMS

FIELD OF THE INVENTION

This invention relates to digital signal superimposing technologies and, more particularly, to a multiplexing system for digital signals formatted on the basis of different standards, a method used therein, a demultiplexing system for separating the digital signal from the other digital signal and a method used therein, computer programs for those methods and information storage media for storing the computer programs.

DESCRIPTION OF THE RELATED ART

There are several standard books describing different ways to express pieces of music. One of the standard books is called as "MIDI (Musical Instrument Digital Interface) standards", and the MIDI standards are popular among musicians who play electronic musical instruments. Music data represented in accordance with the MIDI standards is referred to as "MIDI music data codes". Event codes and delta-time codes are the major part of a set of MIDI music data codes. A note-on event and a note-off event are typical examples of the event code. A tone is generated at the note-on event, and the tone is decayed at the note-off event. The delta-time code is representative of a time period between an event and the next event. The MIDI music data code or codes contain a piece of information, and the information written in the MIDI data code or codes is hereinafter referred to as "MIDI data".

Another standard book is called as "Red Book", which are popular among the audio fans. A music passage is represented by a series of discrete binary values on an analog audio signal, and CDs (Compact-Disc) are used for recording pieces of music in the form of discrete binary values. A series of discrete binary values representative of a music passage is hereinafter referred to as "audio music data codes". The audio music data codes form a set of "audio data code" together with several sorts of control data codes. One of the sorts of control data codes is representative of a lapse of time from initiation of a performance, and is hereinafter referred to as "audio time data codes". The audio music data code contains a piece of information, and the information written in the audio music data code is hereinafter referred to as "audio data".

In the following description, "electronic musical instrument" is representative of equipment to at least either produce pieces of music data representative of a music passage or reproduce tones from the pieces of music data. From this viewpoint, an electronic piano, a synthesizer, a sampling machine, a hard disc recorder, a sequencer and a personal computer system with suitable software are, by ways of example, categorized in the electronic musical instruments. Electronic musical instruments, which produce music passages represented by the MIDI music data, or which reproduce the music passage on the basis of the MIDI music data, are hereinafter referred to as "MIDI musical instruments". Electronic musical instruments, which produce music passages represented by the audio music data codes, or which reproduce the music passages from the audio music data codes, are hereinafter referred to as "electronic audio musical instruments".

Demand on Compromise

Research and development efforts are being made on correlation between the MIDI musical instruments and audio musical instruments. For example, while a musician is playing a part of a piece of music on the MIDI musical instrument, the electronic audio musical instrument sequentially reads out the audio data codes from an information storage medium, and reproduces another part of the piece of music in ensemble with the MIDI musical instrument. Another example is an accompaniment on the electronic audio musical instrument in a recording. While a musician is playing a piece of music on the MIDI musical instrument, the electronic audio musical instrument accompanies the musician, and the musician records his or her performance with a suitable recorder.

In these circumstances, manufacturers find a big demand for a compromise between the MIDI musical instrument and the electronic audio musical instrument. The compromise is expected to process both of the MIDI music data codes and the audio data codes. If the MIDI musical instrument is simply aggregated with the electronic audio musical instrument, not only a MIDI interface but also an interface for the audio data codes are required for the compromise. This results in increase of the production cost.

Moreover, the manufacturers suffer the following problems due to a lot of external cables to be connected to the two sorts of interfaces. First, the two sorts of interfaces require respective signal paths offered to electric signals independently passing through the two sorts of interfaces. The electromagnetic interference is serious, and the manufacturer estimates a great cost in order to develop a countermeasure against the electromagnetic interference. Second, the complicated signal paths make the trouble shooting difficult. Third, some users would fail to exactly connect cables to the two sorts of interfaces, and are irritated against the assembling work. Fourth, the users do not feel the compromise to be graceless due to the many cables connected to the cabinet. Fifth, the two sorts of interfaces occupy a wide area on the cabinet, and make the compromise bulky. Thus, the many external cables are undesirable.

Other problems relate to the complex data management. As described hereinbefore, the MIDI music data codes and audio data codes contain pieces of MIDI data and pieces of audio data, respectively, and are differently formatted. In case where the pieces of MIDI data and pieces of audio data are stored in a single information storage medium, individual data file are required for the MIDI music data codes and audio data codes. Nevertheless, the event codes and audio music data codes are to be synchronously read out from the individual files for the ensemble or the accompaniment. The compromise is expected to sequentially read out the event codes and audio music data codes through a complex timing control. The timing control on the different sorts of data stored in the individual files is very complicated.

Countermeasure Against External Cables

One of the countermeasures against the complicated external cables is built-in system components housed in a cabinet. The external cables are required for the cabinets physically independent of one another. If plural system components are housed in a single cabinet, any external cable is not required for those system components, and the assembling worker internally connects the system components through suitable signal lines before delivery to users. The manufacturers design several electronic musical instruments from the viewpoint of built-in system components. Examples of the electronic musical instruments are an electronic piano with a built-in compact disc player and a synthesizer with a built-in mixer. A part of a music passage is reproduced through the compact disc player during the performance on the electronic piano, an internally produced audio signal and an external produced audio signal are mixed into a single analog audio signal through the built-in mixer.

Another countermeasure against the complicated external cables is an interface/cable available for both of the MIDI music data codes and the audio data codes. The interface and cable are hereinafter referred to as "shared interface" and "shared cable". USB (Universal Serial Bus) terminals and IEEE1394 terminals are examples of the shared interface. In case where an electronic musical instrument is equipped with the shared interface, both of the MIDI data codes and the audio data codes are transmitted and received between the system components through a single shared cable. This results in reduction in the interface/cable.

Countermeasure Against Complex Data Management

A sequencer handles both of the MIDI music data codes and audio data codes, and is incorporated in an electronic musical instrument. A personal computer system runs on a program for handling both of the MIDI music data codes and audio data codes. The computer program is referred to as "sequencer program". A user can control the timing to generate each electronic tone on the basis of the event codes and the timing to generate each electric tone from the audio music data codes through the prior art sequencer or the personal computer system running on the prior art sequencer program. Most of the prior art sequencers/personal computer system running on the prior art sequencer programs permit the user to put both of the MIDI music data codes and audio data codes in a single file.

CD-MIDI standards are known to the person skilled in the art. The CD-MIDI standards are on an extension of the standard for the music compact discs. The music compact disc has a free storage area, which is called as "sub-codes", and the MIDI music data codes are stored in the sub-codes. Thus, the MIDI music data codes are stored in the CD-MIDI together with the audio data codes. Users can easily manage the data on the CD-MIDIs.

However, the prior art countermeasures are less universal. The built-in system component system such as the electronic piano with built-in compact disc player is not open-ended design. If a user wishes to expand the function of the built-in component system, he or she connects another system component to the built-in component system through a cable. The universality is merely different in universality from other prior art electronic musical instruments, and the poor universality is still the problem in the prior art built-in system.

The prior art electronic musical instrument equipped with the USB interface or IEEE1394 interface is communicable with the another electronic musical instrument also equipped with the corresponding interface. The USB interface and IEEE1394 interface have been developed for use in a computer system. The data processing unit communicates with the peripheral equipment through the USB/IEEE1394 interface. For this reason, a high-performance microprocessor is required for the communication through the USB/IEEE1394 interface. However, such a high-performance microprocessor is not incorporated in the electronic musical instruments. For this reason, even if a high-performance microprocessor is incorporated in the prior art electronic musical instrument, it is rare to find system components communicable with the prior art electronic musical instrument. Thus, the prior art electronic musical instrument equipped with the USB/IEEE1394 interface is poor in the universality. Moreover, the high-performance microprocessor is so expensive that the manufacturer is to raise the price of the prior art electronic musical instrument.

Although both of the MIDI music data codes and audio data codes are managed in a single file through the prior art sequencer or the prior art sequencer program, standard electronic musical instruments can not access the MIDI music data codes/audio data codes stored in the file. In other words, users can not share the files created by the prior art sequencer or through the prior art sequencer program. Thus, the prior art sequencer and sequencer program are less universal.

The CD-MIDI standards merely define the data managing rules on the compact discs. In other words, the applications are narrow. It is impossible to transmit the MIDI music data codes through a transmitting channel together with the audio data codes. It is also impossible to duplicate the contents into another sort of information storage medium such as a magnetic disc of a hard disc drive. Since the MIDI music data codes are stored in the data storage area called as sub-codes, it is impossible to handle the MIDI music data codes through standard compact disc drivers. Thus, the data management technologies defined in the CD-MIDI standards are poor in universality.

SUMMARY OF THE INVENTION

It is therefore an important object of the present invention to provide data management technologies, which are enhanced in universality without increase of the production cost.

It is another important object of the present invention to provide a multiplexing system, which stores pieces of music data information represented by audio data codes and other pieces of music data information represented by MIDI music data codes in a digital composite music data signal.

It is also important object of the present invention to provide a method used in the multiplexing system.

It is yet another important object of the present invention to provide a demultiplexing system, which restores certain parts of the digital composite music data signal to the MIDI music data codes.

It is also an important object of the present invention to provide a method used in the demultiplexing system.

It is still another important object of the present invention to provide computer programs, which represent the methods, respectively.

It is also important object of the present invention to provide information storage media, which store the computer programs, respectively.

In accordance with one aspect of the present invention, there is provided a multiplexing system for producing a digital composite music data signal from first music data codes formatted in accordance with a first standard and second music data codes formatted in accordance with a second standard different from the first standard, and the multiplexing system comprises a first data source outputting the first music data codes representative of a first sort of sound, a second data source receiving the second music data codes representative of a second sort of sound and producing a digital music signal containing the second music data codes, a composite signal generator connected to the first data source and the second data source, receiving the first music data codes for storing first data bits thereof therein and successively receiving the digital music signal for replacing second data bits occupying certain bit positions of the second music data codes with the first data bits for producing the digital composite music data signal and a transmitter connected to the composite signal generator for outputting the digital composite music data signal.

In accordance with another aspect of the present invention, there is provided a method for producing a digital composite music data signal from first music data codes formatted in accordance with a first standard and second music data codes formatted in accordance with a second standard different from the first standard, and the method comprises the steps of a) receiving the first music data codes for storing first data bits therein and a digital music signal containing the second music data codes so as to selectively permits second data bits of the digital music signal to pass therethrough, b) monitoring the digital music signal to see whether or not the second data bits occupying at certain bit positions of the second music data codes arrive there, c) replacing the second data bits at the certain bit positions with the first data bits when the answer at the step b) is given affirmative, thereby producing the digital composite music data signal and d) outputting the digital composite music data signal.

In accordance with yet another aspect of the present invention, there is provided a computer program representing a method for producing a digital composite music data signal from first music data codes formatted in accordance with a first standard and second music data codes formatted in accordance with a second standard different from the first standard, and the method comprises the steps of a) receiving the first music data codes for storing first data bits therein and a digital music signal containing the second music data codes so as to selectively permits second data bits of the digital music signal to pass therethrough, b) monitoring the digital music signal to see whether or not the second data bits occupying at certain bit positions of the second music data codes arrive there, c) replacing the second data bits at the certain bit positions with the first data bits when the answer at the step b) is given affirmative, thereby producing the digital composite music data signal and d) outputting the digital composite music data signal.

In accordance with still another aspect of the present invention, there is provided an information storage medium for storing a computer program representing a method for producing a digital composite music data signal from first music data codes formatted in accordance with a first standard and second music data codes formatted in accordance with a second standard different from the first standard, and the method comprises the steps of a) receiving the first music data codes for storing first data bits therein and a digital music signal containing the second music data codes so as to selectively permits second data bits of the digital music signal to pass therethrough, b) monitoring the digital music signal to see whether or not the second data bits occupying at certain bit positions of the second music data codes arrive there, c) replacing the second data bits at the certain bit positions with the first data bits when the answer at the step b) is given affirmative, thereby producing the digital composite music data signal and d) outputting the digital composite music data signal.

In accordance with yet another aspect of the present invention, there is provided a demultiplexing system for separating at least first music data codes formatted in accordance with a first standard from a digital composite music data signal containing the first music data codes and second music data codes formatted in accordance with a second standard different from the first standard, and the demultiplexing system comprises a receiver receiving the digital composite music data signal, a data separator connected to the receiver, monitoring the digital composite music data signal to see whether or not first data bits occupying certain bit positions of the second music data codes arrive thereat and separating the first data bits from the digital composite music data signal for restoring the first data bits to the first music data codes when the answer is given affirmative and a transmitter connected to at least the data separator for transmitting pieces of music data represented by the first music data codes to a destination.

In accordance with still another aspect of the present invention, there is provided a method for separating at least first music data codes formatted in accordance with a first standard from a digital composite music data signal containing the first music data codes and second music data codes formatted in accordance with a second standard different from the first standard, and the method comprises a) receiving the digital composite music data signal, b) monitoring the digital composite music data signal to see whether or not first data bits occupying certain bit positions of the second music data codes arrive, c) separating the first data bits from the digital composite music data signal for restoring the first data bits to the first music data codes and e) transmitting pieces of music data represented by the first music data codes to a destination.

In accordance with yet another aspect of the present invention, there is provided a computer program representing a method for separating at least first music data codes formatted in accordance with a first standard from a digital composite music data signal containing the first music data codes and second music data codes formatted in accordance with a second standard different from the first standard, and the method comprises a) receiving the digital composite music data signal, b) monitoring the digital composite music data signal to see whether or not first data bits occupying certain bit positions of the second music data codes arrive, c) separating the first data bits from the digital composite music data signal for restoring the first data bits to the first music data codes and e) transmitting pieces of music data represented by the first music data codes to a destination.

In accordance with still another aspect of the present invention, there is provided an information storage medium for storing a computer program representing a method for separating at least first music data codes formatted in accordance with a first standard from a digital composite music data signal containing the first music data codes and second music data codes formatted in accordance with a second standard different from the first standard, and the method comprises a) receiving the digital composite music data signal, b) monitoring the digital composite music data signal to see whether or not first data bits occupying certain bit positions of the second music data codes arrive, c) separating the first data bits from the digital composite music data signal for restoring the first data bits to the first music data codes and e) transmitting pieces of music data represented by the first music data codes to a destination.

BRIEF DESCRIPTION OF THE DRAWINGS

The features and advantages of the multiplexing system, method used therein, demultiplexing system and method used therein, computer programs and information storage media will be more clearly understood from the following description taken in conjunction with the accompanying drawings, in which FIG. 3 is a view showing the bit pattern of non-extended audio music data codes, FIG. 4 is a view showing the bit pattern of extended audio music data codes, FIG. 6 is a view showing MIDI words of the MIDI music data code, FIG. 8 is a view showing another format of composite music data codes.

DESCRIPTION OF THE PREFERRED EMBODIMENT

Electronic Musical Instrument

Figure 1:
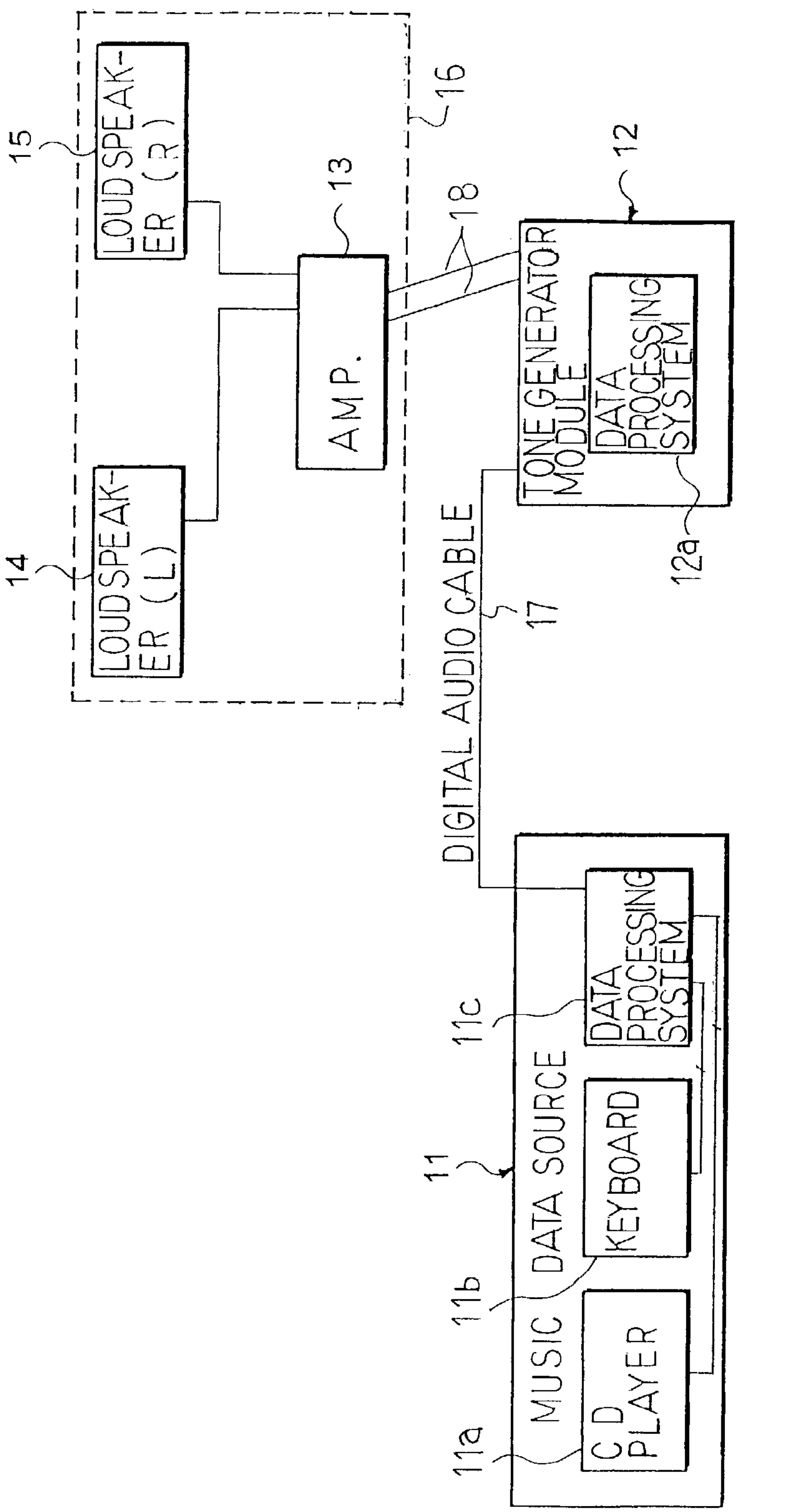
FIG. 1 is a block diagram showing the system configuration of an electronic musical instrument according to the present invention.

Referring first to FIG. 1 of the drawings, an electronic musical instrument embodying the present invention largely comprises a music data source 11, a tone generator module 12 a sound system 16, a digital audio cable 17 and analog audio cables 18. The music data source 11 is connected through the digital audio cable 17 to the tone generator module 12, and the tone generator module 12 is connected to the sound system 16 through the analog audio cables 18. The music data source 11 multiplexes MIDI music data codes and the audio data codes in a digital modulated music data signal, and supplies the digital modulated music data signal through the digital audio cable 17 to the tone generator module 12. The tone generator demultiplexes the MIDI music data codes and audio data codes from the digital modulated music data signal, and converts the MIDI music data codes and audio data codes to analog audio signals. The tone generator module 12 supplies the analog audio signals to the sound system 16 through the analog audio cables 18. The sound system 16 amplifies the analog audio signals from a line level to a speaker level, and converts the analog audio signals to electronic tones and electric tones.

In this instance, the music data source 11 includes a compact disc player 11*a*, a keyboard 11*b* and a data processing system 11*c*. Compact discs are selectively loaded into the compact disc player 11*a*, and the audio data codes are read out from the compact disc. The audio data codes are supplied to the data processing system 11*c*. On the other hand, while a user is fingering a music passage on the keyboard 11*b*, event codes representative of the note-on events and note-off events are generated, and are supplied from the keyboard 11*b* to the data processing system 11*c* together with the delta-time codes. The data processing system 11*c* multiplexes the MIDI music data codes and audio data codes into the digital modulated music data signal, and supplies the digital modulated music data signal through the digital audio cable 17 to the tone generator module 12.

The tone generator module 12 also includes a data processing system 12*a*. The data processing system 12*a* demultiplexes the MIDI music data codes and audio data codes from the digital modulated music data signal. The data processing system 12*a* has a waveform memory, and sequentially reads out waveform data from the waveform memory on the basis of the event codes. A digital audio signal is produced from the waveform data, and is converted to the analog audio signal. The data processing system 12*a* is further operative to carry out a digital-to-analog conversion. The audio music data codes are successively converted to discrete potential levels, and the discrete potential levels form the analog audio signal.

Thus, the MIDI music data codes and audio data codes are multiplexed into the digital modulated music data signal in the music data source 11, and are demultiplexed from the digital modulated music data signal in the tone generator module 12. For this reason, only one digital audio cable 17 is required for the data transmission from the music data source 11 and the tone generator module 12. If a user wishes to store the digital modulated music data signal in a standard information storage medium such as, for example, a compact disc, only one data file is required for the digital modulated music data signal, and the data management is very simple without any special tool. The user can reproduce the MIDI music data codes and audio data codes from the digital modulated music data signal after reading out them from the data file.

System Configuration of Music Data Source

Figure 2:
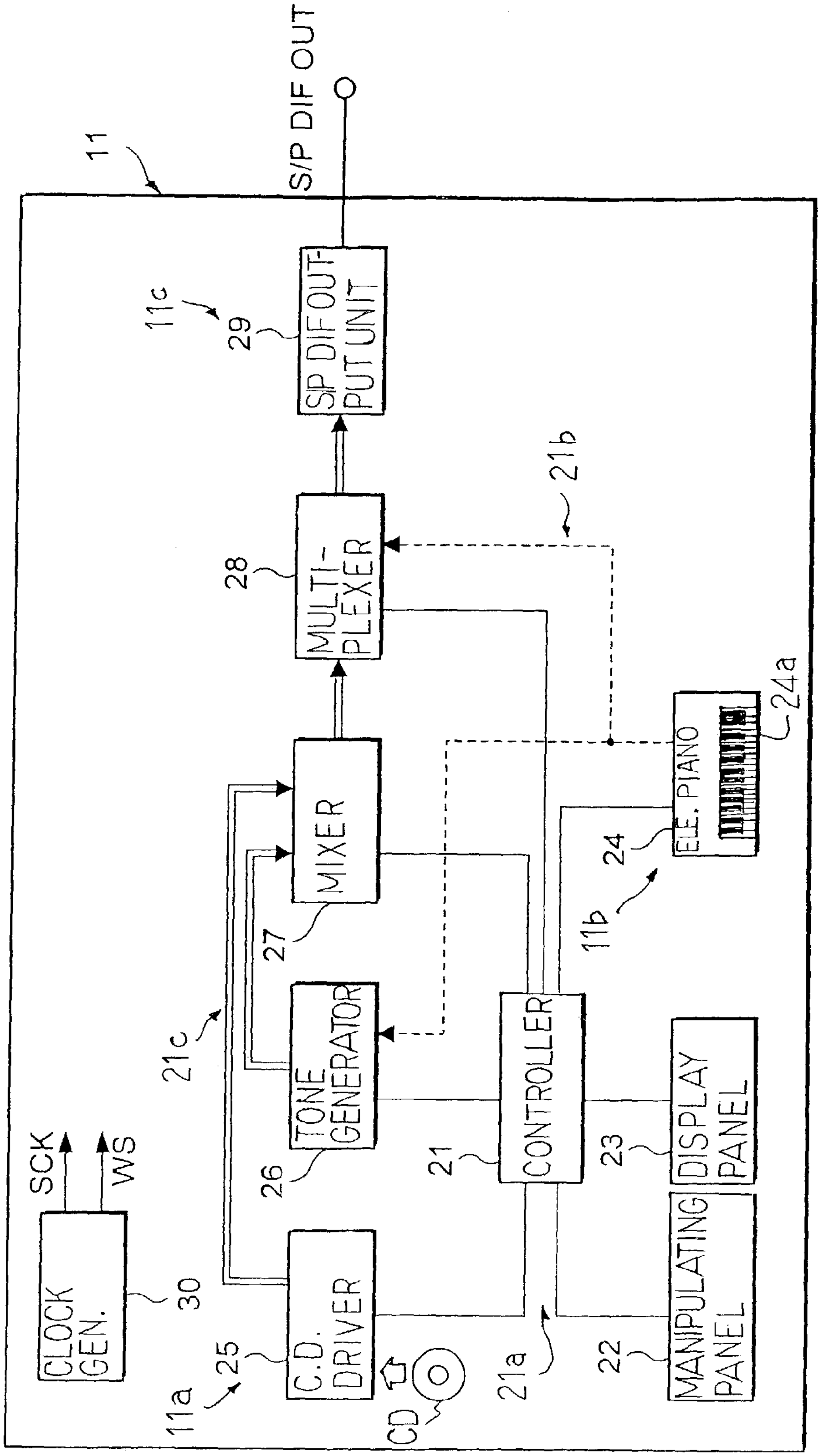
FIG. 2 is a block diagram showing the system configuration of a controller incorporated in the electronic musical instrument.

Turning to FIG. 2 of the drawings, the compact disc player 11*a* includes a compact disc driver 25 and compact discs CD, and the keyboard 11*b* includes an electronic piano 24. Plural series of audio data codes have been stored in the compact discs CD, and the compact disc driver 25 is responsive to user's instruction to selectively read out a series of audio data codes from selected one of the compact discs CD. The electronic piano 24 includes black/white keys 24*a* and a MIDI transmitter. The MIDI transmitter produces the MIDI music data codes, and transmits the MIDI music data codes to the data processing system 11*c*. A user selectively depresses and releases the black/white keys 24*a*, and the MIDI transmitter produces MIDI music data codes representative of his or her performance. A microprocessor and a memory system are incorporated in the MIDI transmitter, and the tasks to be achieved by the microprocessor and memory system will be described in conjunction with the behavior of the data processor in ensemble between the compact disc driver 25 and the electronic piano 24.

The data processing system 11*c* includes a controller 21, a manipulating panel 22, a display panel 23, a tone generator 26, a mixer 27, a multiplexer 28, an S/P DIF output unit 29 and a clock generator 30. The S/P DIF output unit 29 has a data interface defined by the EIAJ (Electronic Industries Association of Japan) Digital Audio Interface Standards EIAJ CP-1201. EIAJ CP-1201 is known to persons skilled in the art as "S/P DIF". For this reason, the output unit 29 is named "S/P DIF output unit". The controller 21 is connected to the manipulating panel 22, display panel 23, electronic piano 24, compact disc driver 25, tone generator 26, mixer 27 and multiplexer 28 through a control bus system 21*a*, and the control bus system 21*a* is indicated by thin real lines in FIG. 2. The controller 21 periodically checks the manipulating panel 22 with a scan signal to see whether or not the user gives any instruction through the manipulating panel 22, and acknowledges jobs to be executed. When the controller 21 determines the jobs, the controller 21 selectively supplies control signals to the electronic piano 24, compact disc driver 25, tone generator 26, mixer 27 and multiplexer 28 for achieving the given jobs. The controller 21 further supplies a video signal to the display panel 23 for producing visual images on the display panel 23. Thus, the controller 21 communicates with the user through the manipulating panel 22 and display panel 23.

The clock generator 30 outputs two clock signals SCK and WS. These clock signals SCK/WS are used in transmission and reception of the MIDI music data codes and audio data codes as will be described hereinlater in detail. The pulse period of the clock signal SCK is calculated as follows.

$$(1/44100)/(24\times2)\times1000000=0.4724 \text{ microsecond}$$

On the other hand, the pulse period of the other clock signal WS is given as $$0.4724\times(24\times2)=22.68 \text{ microsecond}$$

Thus, the pulse periods are different from one another.

A MIDI data bus system 21*b* is connected between the electronic piano 24 and the tone generator 26 and between the electronic piano 24 and the multiplexer 28. Accordingly, the data processor of the electronic piano 24 has a MIDI transmitter, and MIDI receivers are respectively incorporated in the tone generator 26 and multiplexer 28. Broken lines are representative of the MIDI data bus system 21*b* in FIG. 2. Though not shown in the drawings, the MIDI transmitter includes a microprocessor and a memory system, in which random access memories, EPROM (Electrically Programmable Read Only Memory) and another sort of non-volatile memory device. Similarly, the MIDI receiver includes a microprocessor and a memory system constituted by random access memories, an EPROM and another sort of non-volatile memory. The behaviors of the MIDI transmitter and MIDI receivers will be hereinlater described in detail.

An $I^2S$ (Inter-IC Sound) bus system 21*c* is connected between the compact disc driver 25 and the mixer 27, tone generator 26 and the mixer 27, the mixer 27 and the multiplexer 28 and the multiplexer 28 and the SP DIF output unit 29. Double lines stand for the $I^2S$ bus system in FIG. 2. The $I^2S$ bus system is defined for 2-channel digital audio data signals.

While the compact disc driver 25 is outputting the audio data codes, the $I^2S$ bus system 21*c* propagates the audio data codes from the compact disc driver 25 to the mixer 27. FIG. 3 shows the audio music data codes to be propagated through the $I^2S$ bus system 21*c*. The audio music data codes are produced as follows. Voice or tones are converted to an analog audio signal for a left channel and an analog audio signal for a right channel, and series of discrete potential values are sampled from the analog audio signals at the sampling frequency. The discrete potential values are converted to discrete binary values through the pulse code modulation. The discrete binary values are encoded into 16-bit words, and are labeled with "SAMPLE (n)" to "SAMPLE (n+14)". Thus, the voice or tones are represented by 16-bit audio music data codes l(0)–l(15) for the left channel and 16-bit audio music data codes r(0)–r(15) for the right channel. The bits l(15) and r(15) are the most significant bits of the words, and bits l(0) and r(09 are the least significant bits of the words. While the audio music data codes are being propagated through the $I^2S$ bus system 21*c* to the mixer 27, the left-channel audio data code SAMPLE (n) is output from the most significant bit MSB to the least significant bit LSB in serial, and, thereafter, the next audio data code SAMPLE (n+1) is output from the most significant bit MSB to the least significant bit LSB also in serial. Thus, the audio music data codes are serially transmitted to the mixer 27 as a digital audio signal. The data transmission rate is dependent on the sampling frequency. The sampling frequency is assumed to be 44.1 kHz. Time slot of 1/44,100 second is assigned to each sampled data code, i.e., all the data bits of each audio music data code.

Although each discrete potential value is converted to the word, i.e., single word, each of the audio music data codes have extra bits. The extra bits are available for extended data codes or for advanced data transmission protocols in future. FIG. 4 shows extended audio data codes. Each of the audio data codes shown in FIG. 4 has 24 bits, and is broken down into two data fields. The bits L(23)–L(8) of the left-channel extended audio data code are corresponding to the bits l(15)–l(0) of the non-extended audio data code, and are representative of the discrete binary value. Similarly, the bits R(23)–R(8) of the right-channel extended audio data code are corresponding to the bits r(15)–r(0) of the non-extended audio data code, and are representative of the discrete binary value. The extra bits L(7)–L(0) and R(7)–R(0) are zero, and express nothing.

Figure 5:
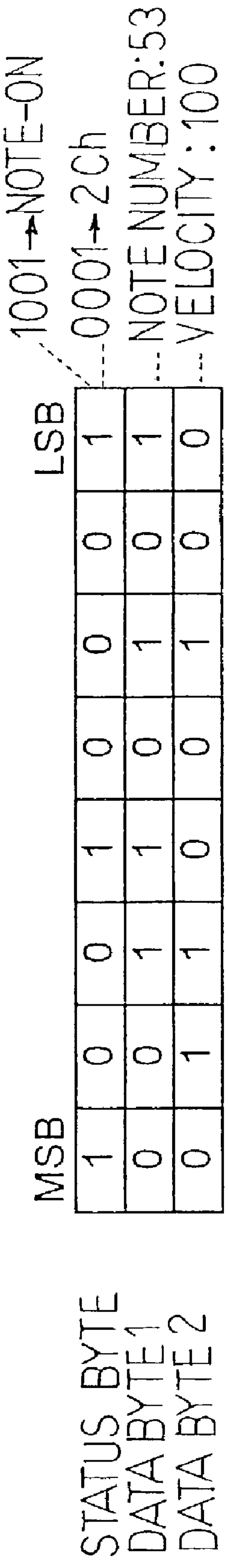
FIG. 5 is a view showing a status byte and associated data bytes of a MIDI music data code.

As described hereinbefore, the electronic piano 24 produces the MIDI music data codes, and the MIDI music data codes are transmitted from the electronic piano 24 through the $I^2S$ bus system 21*c* to the tone generator 26 and multiplexer 28. One of the MIDI music data codes is shown in FIG. 5. The MIDI music data code shown in FIG. 5 is representative of a note-on message, i.e., one of the MIDI messages. A status byte and two data bytes are incorporated in the MIDI music data code, and each byte contains 8 bits. The status byte is further broken down into two nibbles, and the nibbles have different meanings, respectively. In this instance, the high-order nibble is "1001", and the bit string "1001" expresses "note-on". The low-order nibble is "0001", and the bit string "0001" expresses the destination assigned $2^{nd}$ channel. The first data byte expresses the pitch of a tone to be generated. In this instance, the first data byte has the bit string "00110101", and expresses the note number "53". The second data byte expresses the velocity, i.e., the loudness of the tone, and the bit string "01100100" represents the velocity of "100". When the electronic piano 24 transmits the MIDI message to the tone generator/ multiplexer 26/28 through the MIDI data bus system 21*b*, the MIDI transmitter serially outputs each of the three bytes representative of the MIDI message from the least significant bit LSB toward the most significant bit MSB. The transmission of the MIDI music data codes is asynchronous. For this reason, a start bit "0" and a stop bit "0" are required for the asynchronous data transmission of the MIDI byte. The start bit "0" is added to the bit position m(0) before the least significant bit LSB m(1), and the stop bit "1" is added to the bit position m(9) after the most significant bit m(8) as shown in FIG. 6. Thus, two bits are added to the MIDI byte, and the bit string m(0)–m(9) is hereinafter referred to as "MIDI word".

The tone generator 26 is operative to produce a digital audio signal on the basis of the MIDI music data code. A waveform memory, a key assignor and plural data read-out channels are incorporated in the tone generator 26. Plural series of waveform data are stored in the waveform memory, and the key assignor selectively assigns the MIDI message representative of the note-on events to the data read-out channels. A MIDI message is assigned to one of the data read-out channels. Then, the data read-out channel accesses the waveform memory, and successively reads out the series of waveform data representative of the tone indicated by the MIDI message. The read-out waveform data are output from the tone generator 26 as the digital audio signal. The digital audio signal contains plural waveform data codes formatted as shown in FIG. 4. A piece of waveform data is expressed by 16 bits, and 8 extra bits are added to the 16 bits. Thus, the waveform data code has the word consisting of 24 bits.

The mixer 27 mixes the digital audio signal containing the waveform data codes with the digital audio signal containing extended audio data codes, and supplies a digital mixed music data signal to the multiplexer 28. The digital mixed music data signal contains plural music data codes also formatted as shown in FIG. 4. A piece of composite music data is expressed by 16 bits, and 8 extra bits are added to the 16 bits. Thus, the music data code has the word consisting of 24 bits.

The multiplexer 28 is operative to multiplex the digital mixed music data signal and MIDI music data signal, which contains the MIDI music data codes at irregular intervals, to the digital modulated music data signal. The multiplexer 28 supplies the digital modulated music data signal to the S/P DIF output unit 29, and is transmitted from the S/P DIF output unit 29 to the tone generator module 12 through the digital audio cable 17.

Thus, the music data source 11 can produce not only the digital mixed music data signal containing the waveform data codes and extended audio data codes but also the digital modulated music data signal containing the extended audio data codes and MIDI music data codes. The digital mixed musical data signal is transmitted through the digital audio cable 17 to the tone generator module 12, and is converted to the analog audio signals. The analog audio signals are supplied to the sound system 16, and are converted to electric tones. The composite music data signal is also transmitted through the digital audio cable 17 to the tone generator module 12. The MIDI music data codes are separated from the digital mixed music data signal, and are supplied to a tone generator incorporated in the tone generating system 12*a*. The tone generator is similar to the tone generator 26, and produces a digital audio signal on the basis of the MIDI music data codes. The digital audio signal is converted to the analog audio signals, and the analog audio signals are converted to electronic tones.

Description is made on the multiplexer 28 in more detail. When the controller 21 requests the multiplexer 28 to multiplex the audio data codes and MIDI music data codes into a digital composite music data signal, the multiplexer 28 carries out the multiplexing as described hereinafter in detail. If not, the audio data codes are output from the multiplexer 28 as the digital composite music data signal.

Figure 7:
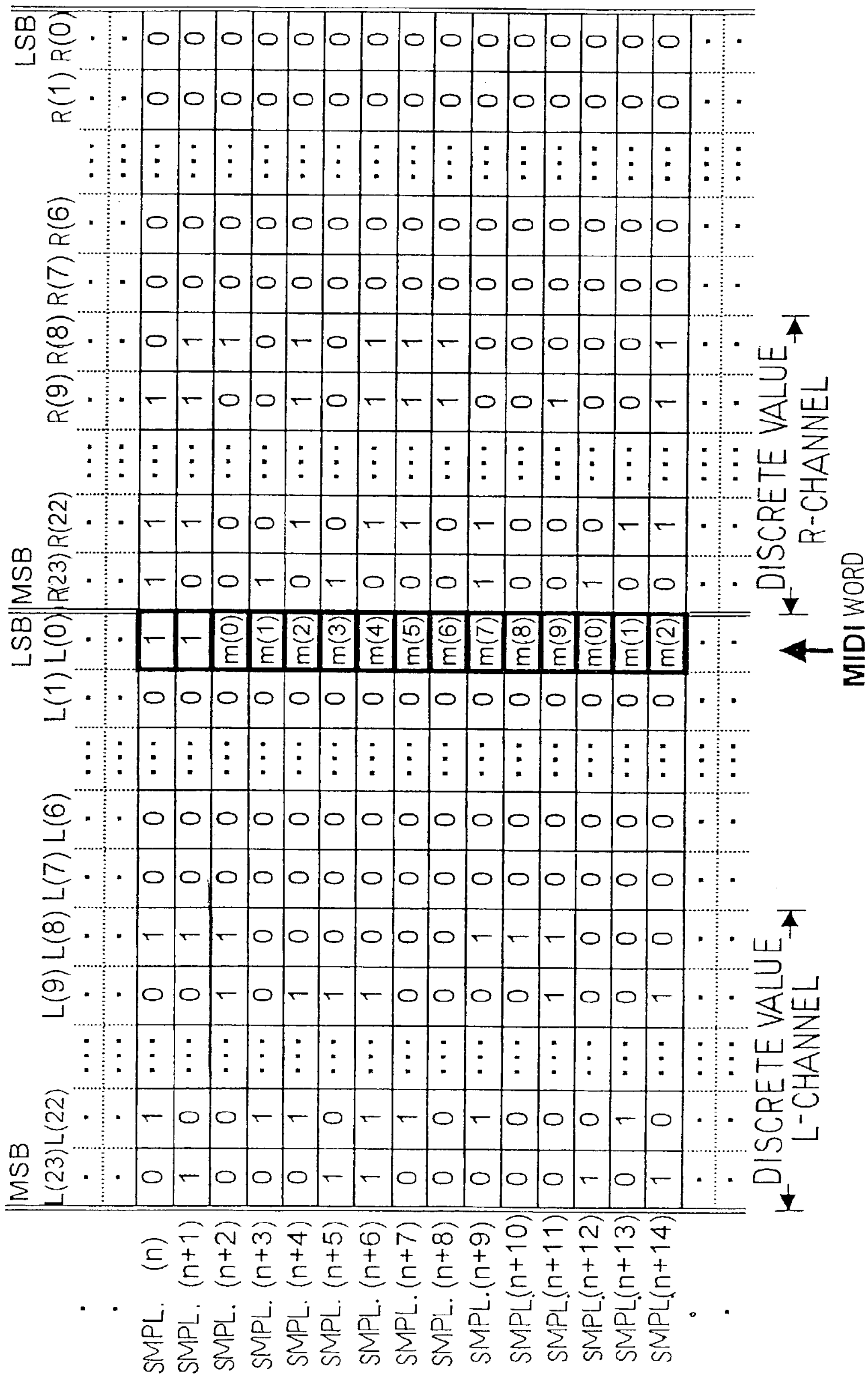
FIG. 7 is a view showing a format of composite music data codes.

The multiplexing proceeds as follows. The multiplexer 28 assigns the least significant bits L(0) of the extended audio data codes SMPL(n), . . . , SMPL(n+14), . . . to the MIDI words, and the least significant bits L(0) are respectively replaced with the bits m(0)–m(9) as shown in FIG. 7. Ten extended audio data codes SMPL(n+2)–SMPL(n+11) are required for transferring a single MIDI word. However, the MIDI music data codes are much smaller in volume than the audio data codes. Moreover, the transmission rate of MIDI music data codes is much slower than the transmission rate of the extended audio data codes due to the long time intervals between each MIDI music data code and the next MIDI music data code. For this reason, the least significant bits l(0) are surely restored to the MIDI music data codes in the tone generator module 12 without time lug.

The extended audio data codes SMPL(n) and SMPL(n+1) have the least significant bits L(0) of "1", and these least significant bits L(0) indicates that the extended audio data codes SMPL(n) and SMPL(n+1) does not contain any part of the MIDI word. The least significant bits L(0) of "1" are discriminative from the stop bit so that the data processing system 12*a* exactly restores the least significant bits L(0) to the MIDI words. The bit "1", which makes the stop bit discriminative, is hereinafter referred to as "dummy bit".

In this instance, only the least significant bits L(0), which are the extra bits of zero, are replaced with the bits m(0)–m(9) forming the MIDI words. More than one extra bit may be replaced with the component bits m(0)–m(9). Even if bits L(8) and all the extra bits L(0)–L(7) are replaced with the bits m(0)–m(9) of the MIDI words, users do not feel the electric tones strange, because the influence of the least significant bits L(8) is minimum. Of course, other data bits are available for the data transmission of the MIDI words in so far as the data bits are less influential in generating the electric tones. In case where ten bits are replaced with the bits m(0)–m(9), each extended audio data code can carry one MIDI word to the tone generator 12.

If the non-extended audio data codes (see FIG. 3) are stored in the compact disc CD, the non-extended audio data codes do not contain any extra bits. Even so, the non-extended audio data codes and MIDI words are multiplexed. The least significant bits l(0) and r(0) have the least influence on the quality of the electric tones. For this reason, the least significant bits l(0) and r(0) are replaced with the bits m(0)–m(9) of the MIDI words as shown in FIG. 8. The bits m(0)/m(1) of the status word (see FIG. 6) occupy the least significant bits l(0) and r(0) of the non-extended audio data code SMPL(n), the bits m(2)/m(3) occupy the least significant bits l(0) and r(0) of the non-extended audio data code SMPL(n+1), the bits m(4)/m(5) occupy the least significant bits l(0) and r(0) of the non-extended audio data code SMPL(n+2), the bits m(6)/m(7) occupy the least significant bits l(0) and r(0) of the non-extended audio data code SMPL(n+3), and the bits m(8)/m(9) occupy the least significant bits l(0) and r(0) of the non-extended audio data code SMPL(n+3). The data words similarly ride on the least significant bits l(0)/r(0) of the other non-extended audio data codes.

The 16-bit non-extended audio data codes express 65536 quantizing steps, i.e., from decimal number −32768 to +32767. Although the non-extended audio data code loses the least significant bit l(0)/r(0), the least significant bit l(0)/r(0) represents the change from one of the 65536 steps to the next step, i.e., from 1/65536 to 2/65536. The change is ignoreable. Thus, the piece of audio music data is not seriously damaged. Nevertheless, description is continued on the assumption that the extended audio data codes are read out from the compact disc CD.

The S/P DIF output unit 29 includes an $I^2S$ bus data reception memory, a data processor and a BMC (Bi-phase Mark Code) modulator. The S/P DIF output unit 29 receives the digital composite music data signal, and stores the extended audio data codes SMPL(n)–SMPL(n+14) in the $I^2S$ bus data reception memory. The data processor reads out each extended audio data code SMPL(n)/ . . . /SMPL(n+14) from the $I^2S$ bus data reception memory, and inverts the bit strings L(23)–L(0)/R(23)–R(0). A 4-bit preamble code and a 4-bit control data code are added to both sides of the inverted bit strings so as to prepare a 32-bit composite music data sub-code for the left channel and another 32-bit composite music data sub-code for the right channel. These 32-bit composite music data sub-codes are respectively assigned two sub-frames, and the 64-bit composite music data code is output from the data processor to the BMC modulator. The clock generator 30 supplies the clock signal SCK to the BMC modulator, and the BMC modulator converts the clock signal SCK to a clock signal of 0.3543 microsecond pulse period for the S/P DIF data transmission. The BMC modulator is responsive to the clock signal of 0.3543 microsecond so as to modulate the 64-bit composite music data codes to the digital modulated music data signal.

System Configuration of Tone Generator Module

Figure 9:
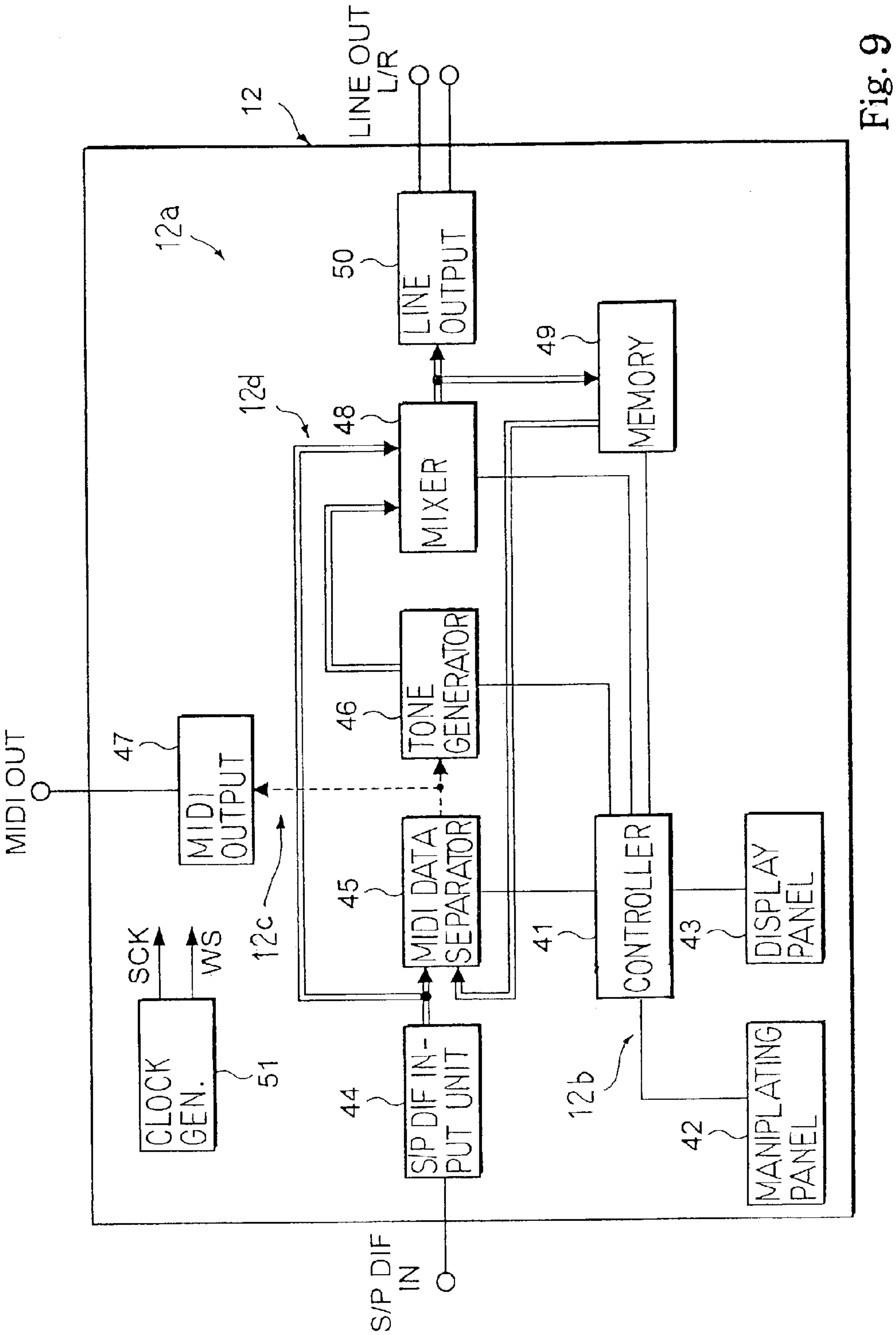
FIG. 9 is a block diagram showing the system configuration of a tone generator module.

Turning to FIG. 9, the data processing system 12*a*,which is incorporated in the tone generator module 12, includes a controller 41, a manipulating panel 42, a display panel 43, an S/P DIF input unit 44, MIDI data separator 45, a tone generator 46, a MIDI data output unit 47, a mixer 48, a memory system 49, a line output unit 50 and a clock generator 51. The MIDI data separator 45 serves as the demultiplexer.

The controller 41 is connected to the manipulating panel 42, display panel 43, MIDI data separator 45, tone generator 46, mixer 48 and memory system 49 through a control bus system 12*b*, and thin real lines represent the control bus system 12*b* in FIG. 9. Users communicate with the controller 41 through the manipulating panel 42 and display panel 43, and give instructions to the controller 41. When the user gives an instruction to the controller 41, the controller 41 assigns jobs to those system components 45 and 46 through the control bus system 12*b*.

A MIDI data bus system 12*c* is connected between the MIDI data separator 45 and the tone generator 46 and between the MIDI data separator 45 and the MIDI output unit 47, and broken lines stand for the MIDI data bus system 12*c*. Accordingly, the MIDI data separator 45 has a MIDI transmitter, and the tone generator 46 and MIDI output unit 47 include MIDI receivers, respectively. For this reason, the MIDI music data codes are transferred from the MIDI data separator 45 to the tone generator 46 or MIDI output unit 47 through the MIDI data bus system 12*c*.

An $I^2S$ bus system 12*d* is connected to the S/P DIF input unit 44, MIDI data separator 45, tone generator 46, mixer 48, line output unit 50 and the memory system 49, and double lines represent the $I^2S$ bus system 12*d*. The clock generator 51 is connected to the S/P DIF input unit 44, MIDI data separator 45, tone generator 46, MIDI output unit 47, mixer 48, line output unit 50 and memory system 49, and generates the clock signals SCK and WS. The clock generator 51 supplies the clock signal SCK to the MIDI data separator 45 and MIDI output unit 47, and further supplies the clock signals SCK and WS to the other system components 46, 48, 50 and 49.

The S/P DIF input unit 44 includes a S/P DIF data reception memory, a data processor and a BMC demodulator. The digital modulated music data signal arrives at the S/P DIF input unit 44. As described hereinbefore, there is a possibility that the MIDI music data codes ride on the digital modulated music data signal. However, the digital modulated music data signal does not always contain the MIDI music data codes. The BMC demodulator reproduces a clock signal, which has the pulse period of 0.3543 microsecond, from the digital modulated music data signal, and demodulates the 64-bit frames from the digital modulated music data signal. The 64-bit composite music data codes are written in the S/P DIF data reception memory.

The data processor sequentially reads out the 64-bit frames from the S/P DIF data reception memory, and removes the preamble codes and control data codes from the 64-bit frames. The bit strings are inverted, again, so as to restore the 64-bit frames to the 24-bit composite music data codes for the right and left channels. The 24-bit composite music data codes are transferred to the MIDI data separator 45 and the mixer 48 through the $I^2S$ bus system 12*d*.

The MIDI data separator 45 demultiplexes the 24-bit composite music data codes to the MIDI words and audio data codes, i.e., separates the MIDI words from the 24-bit composite music data codes. The S/P DIF input unit 44 supplies the 24-bit composite music data codes to the MIDI data separator 45 as described hereinbefore. The composite music data codes may be stored in the memory system 49. This means that the memory system 49 can supply the composite music data codes to the MIDI data separator 45 through the $I^2S$ bus system 12*d*. The MIDI data separator 45 accumulates the least significant bits L(0) in an internal register, and restores the least significant bits L(0) to the MIDI words. If the restored MIDI music data code is representative of a MIDI control message such as, for example, the system exclusive message, the MIDI data separator 45 transfers the restored MIDI music data code through the control bus system 12*b* to the controller 41.

The MIDI output unit 47 receives the restored MIDI words from the MIDI data separator 45, and transmits the restored MIDI words to an external electronic musical instrument through the MIDI out terminal and a MIDI cable (not shown). Although the MIDI output unit 47 is responsive to the clock signal SCK, which has the pulse period of 0.4724 microsecond, for receiving the restored MIDI music data codes from the MIDI data separator 45, the MIDI output unit 47 internally produces a data transmission clock with the pulse period of 32.00 microsecond through a suitable process, and uses the data transmission clock in the transmission of the MIDI music data codes to the external electronic musical instrument. Thus, the MIDI music data codes are transmitted to the external electronic musical instrument at the data transmission rate defined in the MIDI standards.

The memory system 49 has a large capacity non-volatile memory such as, for example, a disc drive or another sort of non-volatile memory. The memory system 49 receives the composite music data codes, in which the MIDI words have been already multiplexed, from the mixer 48 through the $I^2S$ bus system 12*d*. The composite music data codes are stored in the large capacity non-volatile memory together with pieces of control data information such as, for example, the number of bits representative of the quantizing steps, the number of bits forming the word, the number of channel assigned to the MIDI words, the bit position or positions where the MIDI words are stored and the direction to restore the bits to the MIDI words. The data bits representative of the pieces of control data information are formatted together with the audio data codes the format of which is shown in FIG. 7, and the data codes newly formatted are hereinafter referred to as "stored audio data codes".

When the controller 41 requests the memory system 49 to supply the composite music data codes to the MIDI data separator 45, the stored audio data codes are read out from the large-capacity non-volatile memory, and are transferred to the MIDI data separator 45 through the $I^2S$ bus system 12*d*.

The line output unit 50 includes a microprocessor, peripheral devices, an $I^2S$ bus data reception memory, a digital-to-analog converter and amplifiers. The audio data codes are transferred from the mixer 48 through the $I^2S$ bus system 12*d* to the line output unit 50, and are temporarily stored in the $I^2S$ bus data reception memory. The microprocessor sequentially reads out the audio data codes from the $I^2S$ bus data reception memory, and extracts the data bits L(23) to L(8) and R(23) to R(8) from the audio data codes. The microprocessor supplies the extracted bits L(23)–L(8) and R(23)–R(8) to the digital-to-analog converter. The extracted bits L(23)–L(8) and bits R(23)–R(8) are converted to the analog audio signals, and the analog audio signals are amplified through the amplifiers. Thus, the analog audio signals are increased to the line level, and, thereafter, are supplies to the amplifier 13 of the sound system 16.

Behavior of Electronic Musical Instrument

Playback of Compact Disc Only

A user is assumed to instruct the controller 21 to reproduce a piece of music from a series of audio data codes stored in a compact disc CD. When the controller 21 acknowledges the user's instruction, the controller 21 assigns the following jobs to the compact disc driver 25, mixer 27, multiplexer 28 and S/P DIF output unit 29.

The compact disc driver 25 successively reads out the audio data codes from the compact disc CD, and transfers the audio data codes through the $I^2S$ bus system 21*c* to the mixer 27. Since the user does not perform on the electronic piano 24, any MIDI music data code is not supplied to the tone generator 26. In this situation, the audio data codes pass through the mixer 27, and reach the multiplexer 28. The multiplexer 28 simply changes the least significant bits L(0) to "1", which are indicative of bits not forming any part of a MIDI music data code, and supplies the composite music data codes to the S/P DIF output unit 29. The S/P DIF output unit 29 modulates the digital composite music data signal to the digital modulated music data signal, and transmits the digital modulated music data signal through the digital audio cable to the tone generator module 12.

Ensemble between CD and Electronic Piano

If the user instructs the controller 21 to process MIDI music data codes together with the audio data codes, the controller 21 requests the system components to cooperate with the electronic piano 24 for the ensemble.

Transmission from Electric Piano to Tone Generator & Multiplexer

As described hereinbefore, the electronic piano 24 includes the MIDI transmitter, and the microprocessor and memory system are incorporated in the MIDI transmitter. A MIDI data transmission memory and a main memory form parts of the memory system. When the microprocessor is powered, the microprocessor initializes the memory system, and defines the following data storage areas in the main memory and MIDI data transmission memory.

Three data storage areas are defined in the main memory, and are called as "MIDI transmission container", "MIDI transmission register" and "MIDI transmission status". CTN1, RG1 and ST1 stand for the MIDI transmission container, MIDI transmission register and MIDI transmission status, respectively. In detail, a MIDI word to be transmitted is temporarily stored in the MIDI transmission container CTN1, and a data bit m(k) of the MIDI word to be transmitted is temporarily stored in the MIDI transmission register RG1. The data bit m(k), where k is 1 to 9, is transmitted from the MIDI transmission register RG1 to the tone generator 26 and multiplexer 28. The MIDI transmission status ST1 is a pointer, and is indicative of the bit position of the MIDI word to be transmitted. In other words, the MIDI transmission status ST1 is indicative of the bit position m(k) stored in the MIDI transmission register RG1. The MIDI transmission status ST1 is changed between "0" to "9". When the MIDI transmission status ST1 is zero, the MIDI transmission status ST1 indicates that there is not any MIDI word in course of transmission. On the other hand, when the MIDI transmission status ST1 is "1", "2", . . . or "9", the MIDI transmission status ST1 indicates that the data bit m(1), m(2), . . . or m(9) is to be transmitted. The MIDI transmission status ST1 is initially set to zero.

On the other hand, a MIDI transmission buffer BF1 and a MIDI transmission counter CT1 are defined in the MIDI data transmission memory. MIDI words to be transmitted are stored in the MIDI transmission buffer BF1. The MIDI transmission buffer BF1 has plural memory locations as wide as the MIDI word. When a MIDI music data code, which may contain plural MIDI words, arrives at the MIDI transmission buffer BF1, the MIDI word or words are stored in the plural memory locations in the MIDI transmission buffer BF1. The MIDI transmission counter CT1 is indicative of the number of MIDI words stored in the MIDI transmission buffer BF1.

Figure 10:
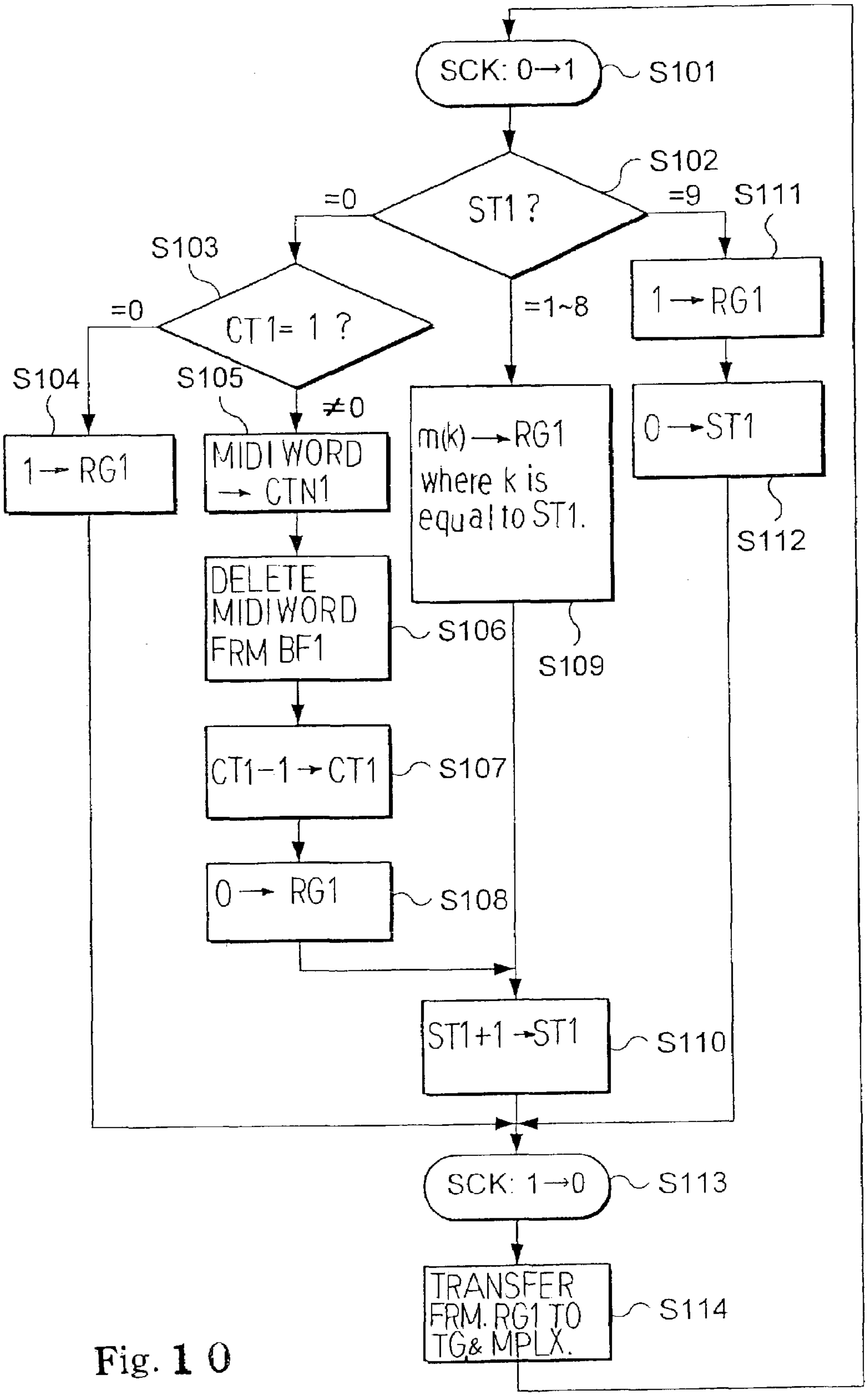
FIG. 10 is a flow chart showing a computer program executed by a MIDI transmitter during a data transmission from an electronic piano to a tone generator and multiplexer.

The MIDI transmitter is responsive to the clock signal SCK, the pulse period of which is about 0.4724 microsecond, so as to execute a routine shown in FIG. 10. While the microprocessor, which is incorporated in the MIDI transmitter, is repeatedly executing the routine, the data bits of the MIDI words are serially transferred from the MIDI register RG1 to the tone generator 26 and multiplexer 28.

In detail, the clock signal SCK is assumed to change the potential level from a low level equivalent to "0" to a high level equivalent to "1", and the microprocessor acknowledges the change to "1" as by step S101. The microprocessor checks the MIDI transmission status ST1 to see what value is presently stored therein as by step S102. The MIDI transmission status ST1 is changed between zero and 9 as described hereinbefore. Step S102 branches to step S103, S109 or Sill depending upon the present value stored in the MIDI transmission status ST1.

The MIDI transmission status ST1 is assumed to be zero. The MIDI transmission status ST1 indicates that there is not any MIDI words in course of transmission. Then, the microprocessor checks the MIDI transmission counter CT1 to see whether or not any MIDI word to be transmitted is stored in the MIDI transmission buffer BF1 as by step S103. If the MIDI transmission status ST1 is zero, there does not remain any MIDI words to be transmitted in the MIDI transmission buffer BF1. Then, the microprocessor proceeds to step S104. The microprocessor puts the dummy bit "1" in the MIDI transmission register RG1 at step S104, and waits for the change of the clock signal SCK from "1" to "0".

When the clock signal SCK changes the potential level from "1" to "0", the microprocessor acknowledges the change of the clock signal SCK as by step S113, and permits the MIDI transmission register RG1 to output the data bit to the tone generator 26 and multiplexer 28 as by step S114. The microprocessor has put dummy "1" in the MIDI transmission register RG1, and the dummy bit "1" is transmitted from the MIDI transmission register RG1 through the MIDI data bus system 21_b_ to the tone generator 26 and multiplexer 28. Upon completion of the data transmission, the microprocessor returns to step S101.

While the microprocessor is not finding any MIDI word in the MIDI transmission buffer BF1, the microprocessor reiterates the loop consisting of steps S101, S102, S103, S104, S113 and S114, and the dummy bit "1" is repeatedly transmitted to the tone generator 26 and multiplexer 28.

The user is assumed to depress a black/white key 24_a_. Then, the microprocessor produces an event code representative of the note-on, and adds the start bit and stop bit to each of the status/data bytes. In other words, the microprocessor produces the MIDI words. Upon completion of the MIDI words, the microprocessor stores the MIDI words to the MIDI transmission buffer BF1, and increases the MIDI transmission counter CT1 to the number indicative of the MIDI words already stored in the MIDI transmission buffer BF1. In case where the note-on event is represented by the three MIDI words shown in FIG. 6, the microprocessor increases the MIDI transmission counter CT1 to "3".

The clock signal SCK is assumed to change the potential level from zero to "1" at step S101. The MIDI transmission status is still zero. However, the MIDI transmission counter CT1 has been changed to the number of MIDI words already stored in the MIDI transmission buffer BF1. For this reason, the microprocessor passes the route from S101 through S102 and S103 to S105.

The microprocessor reads out the first MIDI word from the head of the queue in the MIDI transmission buffer BF1, and transfers the MIDI word to the MIDI transmission container CTN1 at step S105. Subsequently, the microprocessor deletes the first MIDI word from the MIDI transmission buffer BF1 as by step S106. Since the first MIDI word has been deleted from the MIDI transmission buffer BF1, the processor decrements the MIDI transmission counter CT1 by 1 as by step S107. The microprocessor transfers the start bit m(0) from the MIDI transmission container CTN1 to the MIDI transmission register RG1 as by step S108. The start bit m(0) is "0" so that the MIDI transmission register RG1 holds bit "0". The microprocessor proceeds to step S110, and increments the MIDI transmission status ST1 by 1. Then, the MIDI transmission status ST1 is changed from zero to 1, and waits for the change of the clock signal SCK from "1" to "0".

When the clock signal SCK changes the potential level from "1" to "0", the microprocessor acknowledges the change of the clock signal SCK as by step S113, and permits the MIDI transmission register RG1 to output the start bit m(0) to the tone generator 26 and multiplexer 28 as by step S114. Thus, the start bit "0" is transmitted from the MIDI transmission register RG1 through the MIDI data bus system 21_b_ to the tone generator 26 and multiplexer 28. Upon completion of the data transmission, the microprocessor returns to step S101. Upon reception of the start bit "0", the MIDI transmitter notifies the tone generator 26 and multiplexer 28 that the MIDI word follows.

The microprocessor waits for the change from zero to "1". When the clock signal CSK changes the potential level from zero to "1", the microprocessor acknowledges the change at step S101, and proceeds to step S102, again. Since the MIDI transmission status ST1 was incremented to "1" (see step S110), the microprocessor puts the data bit m(1) into the MIDI transmission register RG1 as by step S109, and increments the MIDI transmission status ST1 by one at step S110. The microprocessor waits for the change from "1" to zero. When the clock signal SCK is changed from "1" to zero at step S113, the microprocessor proceeds to step S114. Then, the microprocessor permits the MIDI transmission register to output the data bit m(1) to the tone generator 26 and multiplexer 28 at step S114, and waits for the change from zero to "1".

While the MIDI transmission status ST1 is being stepwise incremented from 1 to 8, the microprocessor reiterates the loop consisting of steps S101, S109, S110, S113 and S114, and the data bits m(1)–m(8) are transmitted from the MIDI transmission register RG1 to the tone generator 26 and multiplexer 28.

Upon completion of the data transmission on the data bits m(1)–m(8), the MIDI transmission status ST1 is indicative of "9". When the clock signal SCK is changed from zero to "1" at step S101, the microprocessor proceeds to step S102. The microprocessor acknowledges that the MIDI transmission status ST1 has been indicative of "9" at step S102, and puts stop bit "1" into the MIDI transmission register RG1 as by step S111. Subsequently, the microprocessor changes the MIDI transmission status ST1 to zero as by step S112, and waits for the change of the clock signal SCK from "1" to zero. When the clock signal SCK is changed to zero at step S113, the microprocessor transmits the stop bit "1" to the tone generator 26 and multiplexer 28 at step S114.

Upon completion of the data transmission on the first MIDI word, the microprocessor checks the MIDI transmission status to see whether or not the MIDI word stored in the MIDI transmission container CTN1 is still in course of transmission at step S102. The MIDI transmission status ST1 was changed to zero at step S112 so that the microprocessor proceeds to step S103. The microprocessor checks the MIDI transmission counter CT1 to see whether or not any MIDI word is left in the MIDI transmission buffer BF1. Two more MIDI words are left in the MIDI transmission buffer BF1. Then, the microprocessor transfers the next MIDI word from the MIDI transmission buffer BF1 to the MIDI transmission container CTN1 at step S105, and successively executes the jobs at steps S106–S108, S110, S113 and S114 so as to transmit the start bit m(0) to the tone generator 26 and multiplexer 28. The microprocessor repeats the loop consisting of S101, S102, S110, S113 and S114 for transmitting the data bits m(1) to m(8) to the tone generator 26 and multiplexer 28. Finally, the microprocessor transmits the stop bit "1" to the tone generator 26 and multiplexer 28 through the execution of the jobs at steps S101, S102, S111 to S114.

As will be understood, the microprocessor transmits all the MIDI words to the tone generator 26 and multiplexer 28 through the execution of the computer program shown in FIG. 10, and inserts the dummy bits through the loop consisting of steps S101–S104, S113 and S114 in the absence of the MIDI word.

Figure 11:
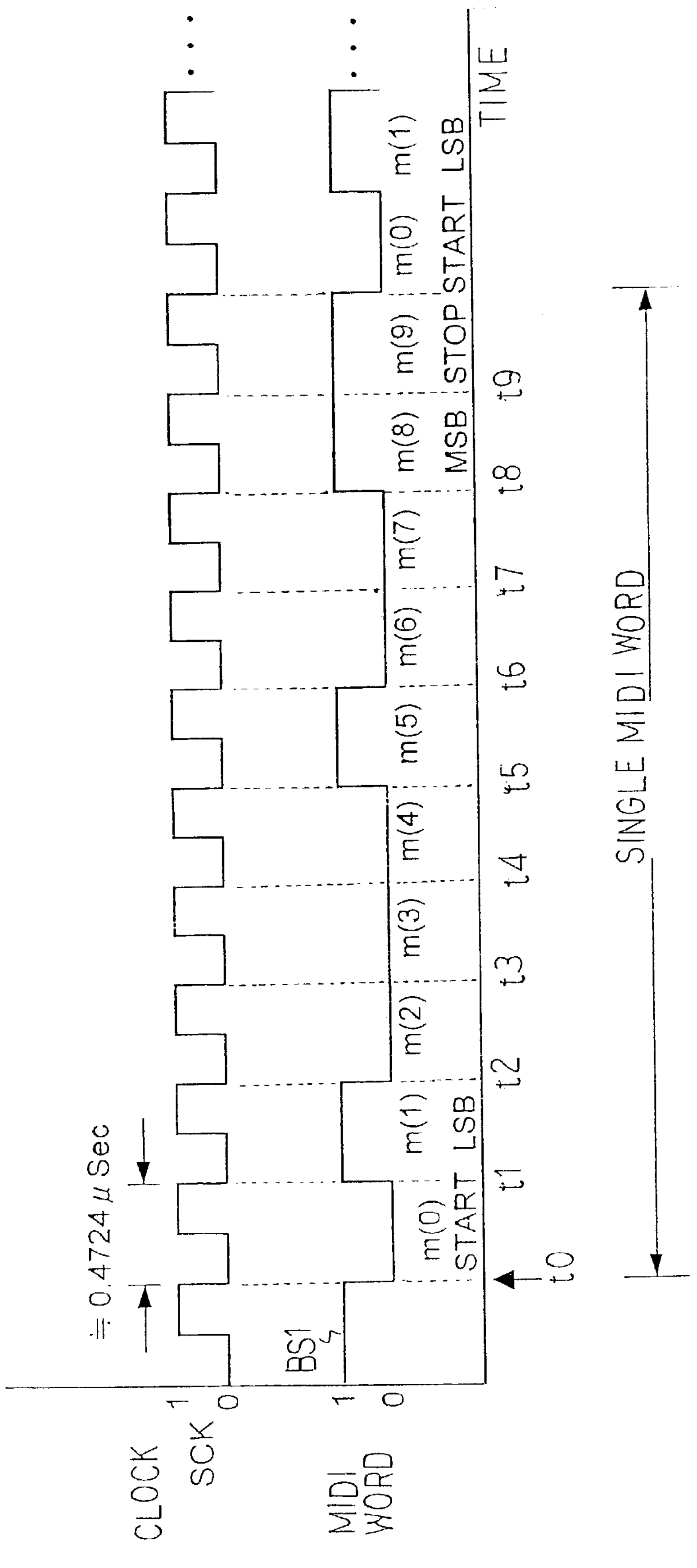
FIG. 11 is a timing chart showing data bits of a MIDI word on a MIDI data bus system.

FIG. 11 shows the reception of the MIDI words on the MIDI data bus system 21*b*. The MIDI words form parts of a bit string BS1, because the dummy bits are inserted between the MIDI words. The clock signal SCK changes the potential level between zero to "1". The pulse period is about 0.4724 microsecond. When the clock signal rises, the MIDI transmitter starts to put a data bit to be transmitted in the MIDI transmission register RG1. The data bit is output from the MIDI transmission register RG1 to the MIDI data bus system 21*b* at every pulse fall. The clock signal SCK falls at t0, t1, t2, t3, t4, t45, t6, t7, t8 and t9, and the start bit m(0), data bits m(1) to m(8) and stop bit m(9) are output from the MIDI transmission register RG1 at t0, t1–t8 and t9. Thus, the data bits of each MIDI word is serially transferred from the MIDI transmitter of the electronic piano 24 through the MIDI data bus system 21*b* to the tone generator 26 and multiplexer 28.

The MIDI words are supplied through the MIDI data bus system 21*b* to the tone generator 26 and multiplexer 28. The tone generator assigns the data read-out channels to the event codes representative of the note-on events, and the data read-out channels access the waveform memory so as to read out the pieces of waveform data. The pieces of waveform data are produced into the digital audio signal. On the other hand, the multiplexer multiplexes the digital mixed music data signal and MIDI words into the digital composite music data signal. Description is hereinafter made on the multiplexing.

Reception at Multiplexer

As described hereinbefore, the multiplexer 28 includes the MIDI receiver, and a microprocessor and a memory system are incorporated in the MIDI receiver. A main memory and MIDI reception memory form parts of the memory system. When the microprocessor starts to execute a computer program for the multiplexing, the microprocessor defines the following memory areas in the main memory and MIDI reception memory.

A MIDI reception register RG2, a MIDI reception container CTN2 and a MIDI reception status ST2 are defined in the main memory. The bit string BS1, which contains the MIDI words, reaches the MIDI receiver of the multiplexer 28, and is temporarily stored in the MIDI reception register RG2. The MIDI reception container CTN2 has plural addressable memory locations, the addresses of which are labeled with mr(1), mr(2), . . . and mr(9), and a received MIDI word is stored in the MIDI reception container CTN2. The MIDI reception status ST2 is a pointer, which is changed between zero and "9". When the MIDI reception status ST2 is zero, the dummy bits successively arrive at the MIDI reception register RG2. On the other hand, if the MIDI reception status ST2 is indicative of a natural number (j) between "1" to "9", the MIDI reception status ST2 indicates that the bit of the MIDI word is to be stored at the address mr(j). When the microprocessor starts a computer program for reception of MIDI words, the MIDI reception status ST2 is initially set to zero.

On the other hand, a MIDI reception buffer BF2 and a MIDI reception counter CT2 are defined in the MIDI reception memory. The MIDI reception buffer BF2 has plural memory locations to be assigned the received MIDI words, and the MIDI reception counter CT2 is indicative of the number of MIDI words stored in the MIDI reception buffer BF2. The MIDI reception counter CT2 is also set to the initial value, i.e., zero.

Figure 12:
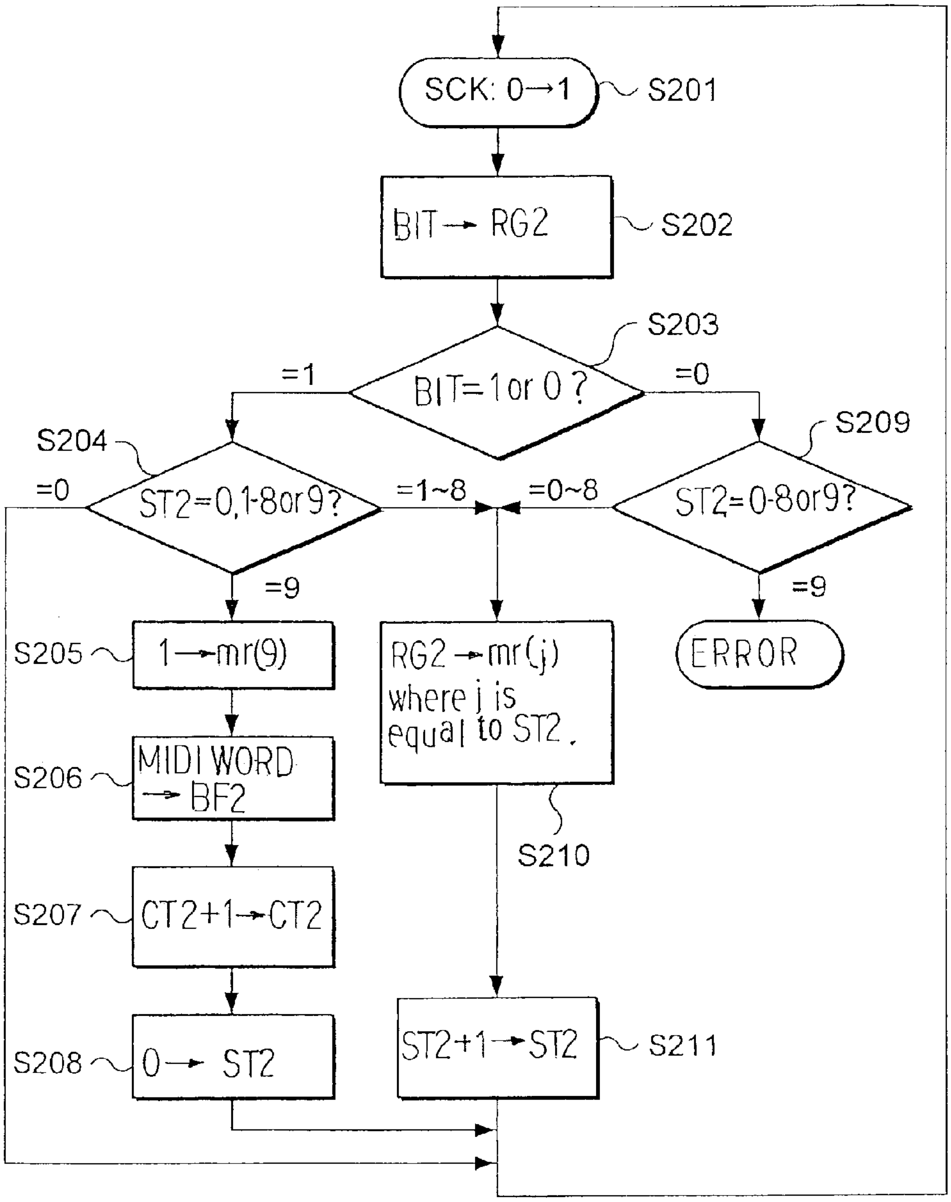
FIG. 12 is a flowchart showing a computer program executed by a MIDI receiver during the data transmission from the electronic piano to the multiplexer.

The clock generator 39 supplies the clock signal SCK to the multiplexer 28, and the microprocessor of the MIDI is responsive to the clock signal SCK to achieve jobs as shown in FIG. 12.

The clock signal SCK is assumed to change the potential level from zero to "1" as by step S201. The microprocessor fetches the bit on the MIDI data bus system 21*b*, and stores it in the MIDI reception register RG2 as by step S202. Subsequently, the microprocessor checks the MIDI reception register RG2 to see whether the received bit is indicative of 1 or zero as by step S203. If the received bit is "1", the microprocessor proceeds to step S204, and checks the MIDI reception status ST2 to see whether or not the value is 0, 1–8 or 9.

While the MIDI reception status ST2 is indicative of zero, the dummy bits of "1" successively arrive at the MIDI reception register RG2, and the microprocessor waits for the change of the clock signal SCK from zero to "1". The microprocessor passes through steps S203 and S204, and returns to step S201. Thus, the microprocessor ignores the dummy bits, and does not transfer the dummy bits to the MIDI reception container CTN2.

Assuming now that the bit "0" reaches the MIDI transmitter, the clock signal SCK is changed from zero to "1" at step S201, and the received bit "0" is temporarily stored in the MIDI reception register RF2 at step S202. The microprocessor decides the received bit to be "1", and proceeds to step S209. The microprocessor checks the MIDI reception status ST2 to see whether or not the value is 0–8 or 9 at step S209. If the value is 9, the address mr(9) is assigned to the stop bit "1", and the received bit "0" is conflict with the stop bit "1". The microprocessor decides that the MIDI transmitter committed an error, and takes a step against the error. However, the MIDI reception status is indicative of the address mr(0) after the dummy bits, because the microprocessor set the MIDI reception status for the initial value of zero in the initialization or step S208. The microprocessor writes the received bit "0" into the memory location mr(0) of the MIDI reception container CTN2 at step S210. Thus, the start bit "0" is stored at the memory location mr(0) of the MIDI reception container CTN2. Subsequently, the microprocessor increments the MIDI reception status ST2 by one, and the MIDI reception status is indicative of the address mr(1).

The MIDI data bits m(1) to m(8) follow the start bit "0". The microprocessor acknowledges the change from zero to "1" at step S201, and temporarily stores the received bit in the MIDI reception register RG2 at step S202. The microprocessor checks the MIDI reception register RG2 to see whether or not the received bit is indicative of 1 or zero, and branches to either step S204 or step S209 depending upon the value of the received bit. However, while the MIDI reception status ST2 is indicating a value between "1" and "8", the microprocessor proceeds to step S210. The microprocessor writes the received bit into the memory location mr(j) of the MIDI reception container at step S210, and increments the MIDI reception status ST2 by one at step S211. Thus, the microprocessor reiterates the loop consisting of steps S201–S204, S210 and S211 or the loop consisting of steps S201–S203 and S209–S211 depending upon the value of the received bit for writing the MIDI data bits m(1)–m(8) in the memory locations mr(1)–mr(8) of the MIDI reception container CTN2.

After writing the MIDI data bit m(8) in the MIDI reception container CTN2, the microprocessor increments the MIDI reception status ST2 to "9" at step S211, and waits for the change of the clock signal SCK. The clock signal SCK changes the potential level from "0" to "1", and the microprocessor acknowledges the change at step S201, and stores the received bit in the MIDI reception register RG2 at step S202. The stop bit "1" follows the MIDI data bit m(8). For this reason, the microprocessor proceeds to step S204. The MIDI reception status ST2 has been already incremented to "9" so that the microprocessor proceeds to step S205. The microprocessor writes "1" into the memory location mr(9) at step S205. Thus, the MIDI word, i.e., start bit "0", MIDI data bits m(1) to m(8) and stop bit "1" are stored in the MIDI reception container CTN2.

Subsequently, the microprocessor transfers the MIDI word from the MIDI reception container CTN2 to the MIDI reception buffer BF2 as by step S206, and increments the MIDI reception counter CT2 by one as by step S207. The microprocessor makes the MIDI reception status ST2 return to zero as by step S208, and waits for the next start bit "0".

If the MIDI word or words are further transmitted from the MIDI transmitter to the MIDI receiver, the microprocessor reiterates the loop consisting of steps S201 to S211, and accumulates the MIDI words in the MIDI reception buffer BF2. If, on the other hand, the dummy bits follow the MIRI word, the microprocessor reiterates the loop consisting of steps S201 to S204, and eliminates the dummy bits from the bit string MD. As a result, only the MIDI words are accumulated in the MIDI reception buffer BF2.

The multiplexer 28 carries out the multiplexing in parallel to the accumulation of the MIDI words. The multiplexer 28 requires a microprocessor and the memory system for the multiplexing. The memory system includes the main memory and the MIDI data reception memory which are shared with the MIDI data reception. The microprocessor may be shared between the accumulation of the MIDI words and the multiplexing.

Multiplexing

When the microprocessor starts a computer program, which will be hereinlater described in detail, the microprocessor defines the followings in the memory system. Two flags FG1/FG2, a sample transmission and reception register RG3, a sample transmission and reception status ST3, a MIDI transmission container CTN3, a MIDI transmission register RG4 and a MIDI transmission status ST4 are defined in the main memory, and the MIDI reception buffer BF2 and the MIDI reception counter CT2 are used in the multiplexing.

The flag FG1 is assigned to the previous potential level of the clock signal WS. The clock signal WS is changed between a high level equivalent to "1" and a low level equivalent to "0", and the previous potential level, i.e., "1" or "0" is stored in the flag FG1. The microprocessor sets the flag FG1 for "1" in the initialization.

The flag FG2 is assigned to the present potential level of the clock signal WS. The microprocessor compares the flag FG1 with the flag FG2 so as to detect the pulse rise and pulse fall of the clock signal WS. The microprocessor also sets the flag FG2 for "1" in the initialization.

The sample transmission and reception register RG3 is assigned to a bit string SD of the digital mixed music data signal supplied from the mixer 27. The mixer 27 supplies the digital mixed music data signal through the $I^2S$ bus system 21*c* to the multiplexer 28, and the microprocessor temporality stores the bit string SD in the sample transmission and reception register RG3.

The sample transmission and reception status ST3 is a pointer indicative of the bit position in the bit string SD received from mixer 27 and transferred to the S/P DIF output unit 29. The microprocessor sets the sample transmission and reception status ST3 for "0" in the initialization.

The MIDI transmission container CTN3 is assigned to the MIDI word to be multiplexed with the digital mixed music data signal. The microprocessor temporarily stores the MIDI word in the MIDI transmission container CTN2 before the multiplexing.

The MIDI transmission register RG4 is assigned to a data bit forming a part of the MIDI word stored in the MIDI transmission container CTN3. The microprocessor temporarily moves the data bit from the MIDI transmission container CTN3 to the MIDI transmission register RG4 before the multiplexing.

The MIDI transmission status ST4 is a pointer indicative of the bit position of the MIDI words already stored in the MIDI transmission container CTN3. The microprocessor sets the MIDI transmission status ST4 for "0" in the initialization.

The MIDI reception buffer BF3 is assigned to the MIDI words. The MIDI reception buffer BF3 has plural memory locations with the bit width equal to the bit width of the MIDI words.

The MIDI reception counter CT3 is indicative of the number of MIDI words presently stored in the MIDI reception buffer BF3. The microprocessor sets the MIDI reception counter CT3 for zero in the initialization.

Figure 13:
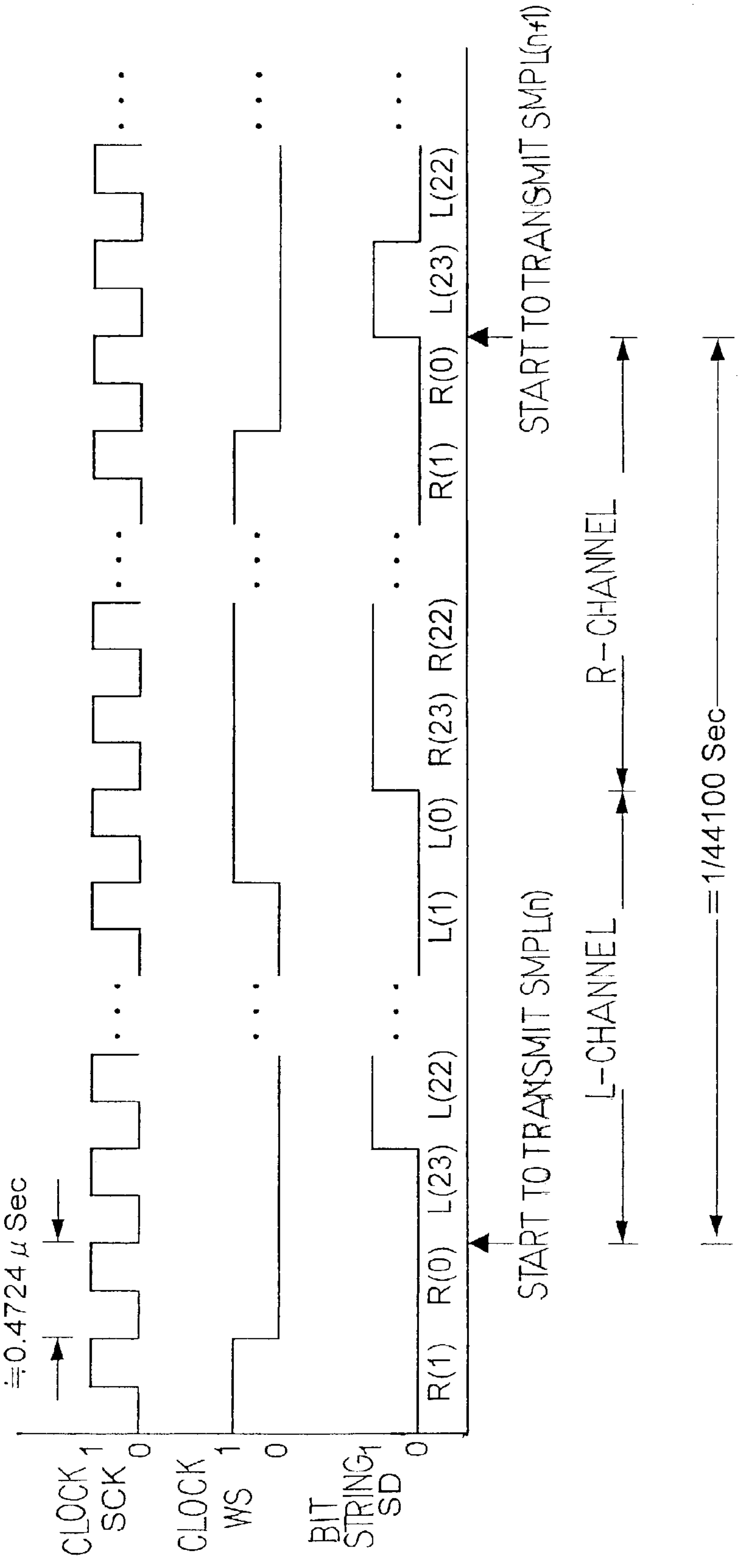
FIG. 13 is a timing chart showing a multiplexing operation on the audio data codes and MIDI words.
Figure 14:
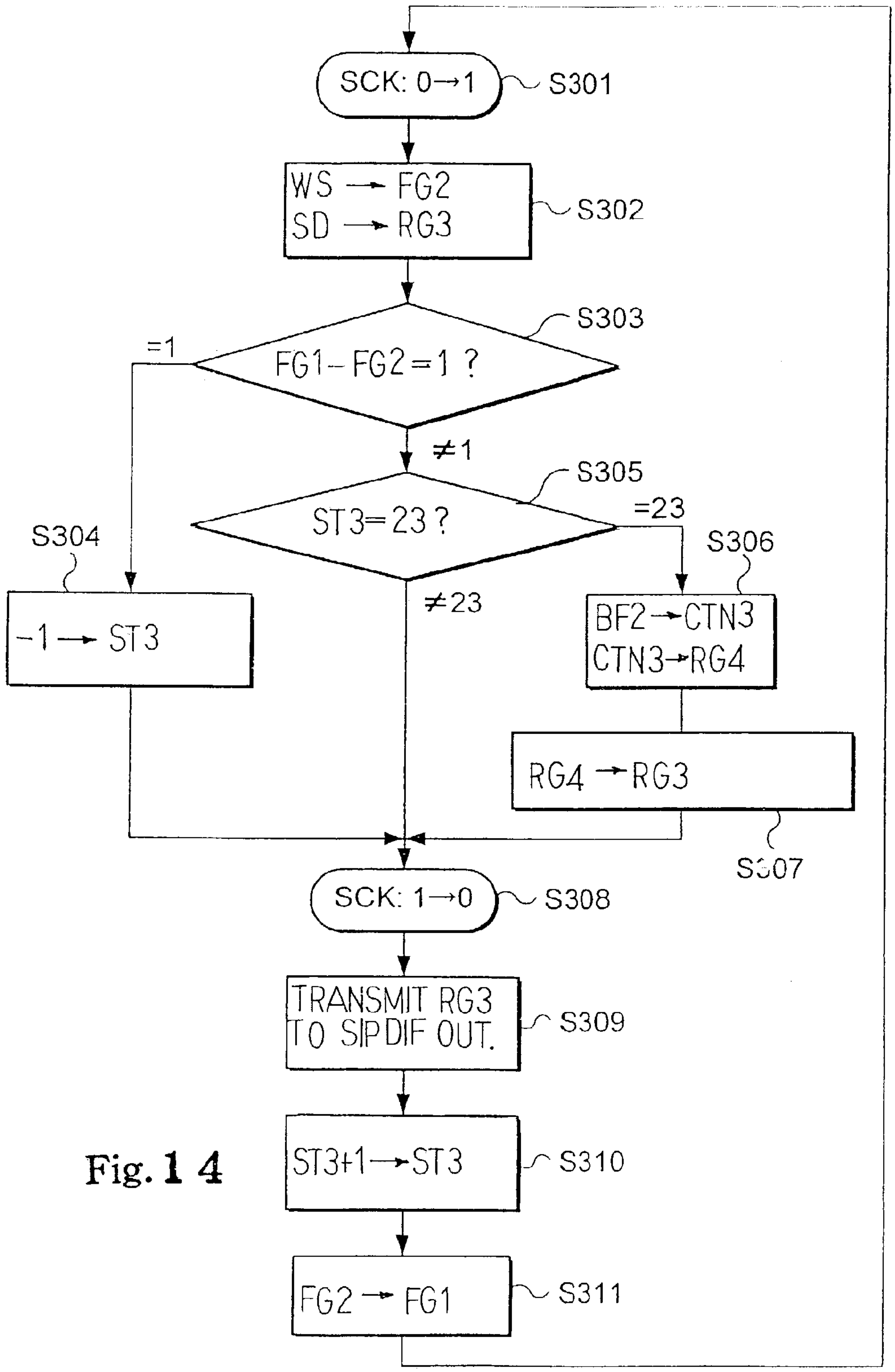
FIG. 14 is a flow chart showing a computer program for the multiplexing operation.

The clock generator 30 supplies both of the clock signals SCK and WS to the multiplexer 28. The waveforms of the clocks SCK/WS are illustrated in FIG. 13 together with the bit string SD. The microprocessor successively stores the bit string SD in the sample transmission and reception register RG3, and supplies the bit string SD from the sample transmission and reception register RG3 to the $I^2S$ bus system 21*c*. The reception and transmission is carried out in synchronization with the clock signal SCK. The clock signal SCK further defines the execution of the computer program shown in FIG. 14.

When the clock signal SCK is changed from zero to "1", the microprocessor acknowledges the potential change of the clock signal SCK at step S301, and stores the present potential level of the clock WS and the bit on the $I^2S$ bus system 21*c* into the flag FG2 and sample transmission and reception register RG3, respectively, as by step S302.

Subsequently, the microprocessor subtracts the value stored in the flag FG2 from the value stored in the other flag FG1, and determines whether or not the difference is equal to 1 as by step S303. As shown in FIG. 13, each audio data code such as SMPL(n) is output from the most significant bit L(23) to the least significant bit L(0) and, thereafter, from the most significant bit R(23) to the least significant bit R(0), and the data transmission of each audio data code SMPL is completed within a single pulse period of the clock signal WS. The clock signal WS changes the potential level from "1" to "0" immediately before the transmission of the least significant bit R(0). For this reason, when the microprocessor entered the computer program at step S301 during the data transmission of the least significant bit R(0), the flag FG2 is indicative of zero, and the microprocessor finds the difference to be "1". For this reason, the microprocessor proceeds to step S304. The microprocessor changes the sample transmission and reception status ST3 to −1 at step S304, and waits for the potential change of the clock signal SCK from "1" to zero.

When the microprocessor acknowledges the change from "1" to zero at step S308, the microprocessor transmits the received bit R(0) from the sample transmission and reception register RG3 to the S/P DIF output unit 29 as by step S309. The microprocessor increments the sample transmission and reception status ST3 by one as by step S310. The sample transmission and reception status ST3 has been set for −1 at step S304 so that the sample transmission and reception status ST3 is indicative of zero after the execution at step S310. Subsequently, the microprocessor transfers the value from the flag FG2 to the flag FG1. Thus, the value “0” is stored in the flag FG1.

When the microprocessor acknowledges the potential change from zero to “1” at step S301, the microprocessor stores the present potential level of the clock signal WS and the next bit of the bit string SD into the flag FG2 and the sample transmission and reception register RG3, respectively, at step S302. As shown in FIG. 13, the next bit is the most significant bit L(23) for the left channel, and the clock signal WS keeps the potential level zero. Thus, the most significant bit L(23) and zero are respectively stored in the sample transmission and reception register RG3 and the flag FG2.

The microprocessor subtracts the value stored in the flag FG2 from the value stored in the flag FG1, and finds the difference to be zero at step S303. Then, the microprocessor proceeds to step S305, and checks the sample transmission and reception status ST3 to see whether or not the status ST3 is equal to 23. The sample transmission and reception status ST3 has increased to zero at step S310. For this reason, the answer is given negative, and the microprocessor waits for the potential change of the clock signal.

When the microprocessor acknowledges the potential change from “1” to zero at step S308, the microprocessor transmits the most significant bit L(23) from the sample transmission and reception register RG3 to the S/P DIF output circuit S309 at step S309, and increments the sample transmission and reception status ST3 by one at step S310. The microprocessor transfers the value from the flag FG2 to the flag FG1, and waits for the potential change from zero to “1”.

When the microprocessor acknowledges the potential change from zero to “1” at step S301, the microprocessor restarts the loop consisting of steps S302 to S305 and S308 to S311 for transmitting the next bit from the sample transmission and reception register RG3 to the S/P DIF output unit 29. Thus, while the sample transmission and reception status ST3 is stepwise being incremented from zero toward 23, the microprocessor transmits the received bits L(23) to L(1) to the S/P DIF output unit 29 through the loop consisting of steps S302 to S305 and S308 to S311.

When the transmission of the data bit L(1) is completed at step S309, the microprocessor increments the sample transmission and reception status ST3 to “23” at step S310, and, thereafter, transfers the value from flag FG2 to the flag FG1 at step S311. In the next execution loop, the microprocessor finds the sample transmission and reception status ST3 to be “23”, and proceeds to step S306. The microprocessor gets ready to transmit one of the data bits of the MIDI word at step S306.

Step S306 is similar to the loop consisting of steps S102 to S110 of the computer program shown in FIG. 10. As described hereinbefore, the bit string MD are restored to the MIDI words through the computer program shown in FIG. 12. The MIDI words are accumulated in the MIDI reception buffer BF2, and the MIDI reception counter CT2 is indicative of the number of MIDI words stored in the MIDI reception buffer BF2. Upon entry into step S306, the microprocessor checks the MIDI reception counter CT2 to see whether or not any MIDI words has been accumulated in the MIDI reception buffer BF2. If the microprocessor finds the MIDI reception counter CT2 to be zero, the microprocessor puts the dummy bit “1” in the MIDI transmission register RG4, and, thereafter, proceeds to step S307.

If the microprocessor finds the MIDI reception counter CT2 to indicate at least one MIDI word already accumulated in the MIDI reception buffer BF2, the microprocessor transfers the MIDI word from the MIDI reception buffer BF2 to the MIDI transmission container CTN3. The microprocessor takes out one of the data bits from the MIDI transmission container CTN3 to the MIDI transmission register RG4, and increments the MIDI transmission status ST4 by one. The MIDI transmission status ST4 is changed between zero to “9”, and indicates the bit position to be transmitted to the MIDI transmission register RG4. Thus, the microprocessor transfers one of the MIDI data bits from the MIDI transmission container CTN3 to the MIDI transmission register RG4 through every execution at step S306.

Subsequently, the microprocessor reads out the MIDI data bit or dummy bit from the MIDI transmission register RG4 to the sample transmission and reception register RG3 as by step S307. The microprocessor waits for the potential change of the clock signal SCK.

When the microprocessor acknowledges the potential change from “1” to zero at step S308, the microprocessor transmits the MIDI data bit or dummy bit from the sample transmission and reception register RG3 to the S/P DIF output unit 29 at step S309. Thus, the least significant bit L(0) is replaced with the MIDI data bit or dummy bit “1”.

Subsequently, the microprocessor increments the sample transmission and reception status ST3 by one at step S310, and transfers the value from the flag FG2 to the flag FG1. Since the sample transmission and reception status ST3 has been changed from 23, the microprocessor reiterates the loop consisting of steps S301 to S303, S305 and S308 to S311 so that the data bits R(23) to R(1) are successively transmitted from the sample transmission and reception register RG3 to the S/P DIF output unit 29.

When the least significant bit R(0) of the next audio data code SMPL(n+1) reaches the sample transmission and reception register RG3, the microprocessor finds the difference between the flag FG1 and the flag FG2 to be “1”, and repeats the above described jobs for transmitting the data bits R(0), L(23) to L(1), MIDI data bit or dummy bit and data bits R(23) to R(1) to the S/P DIF output unit 29.

As will be understood, the MIDI words and digital mixed music data signal are multiplexed into the digital composite music data signal.

Transmission to Tone Generator Module

Figure 15:
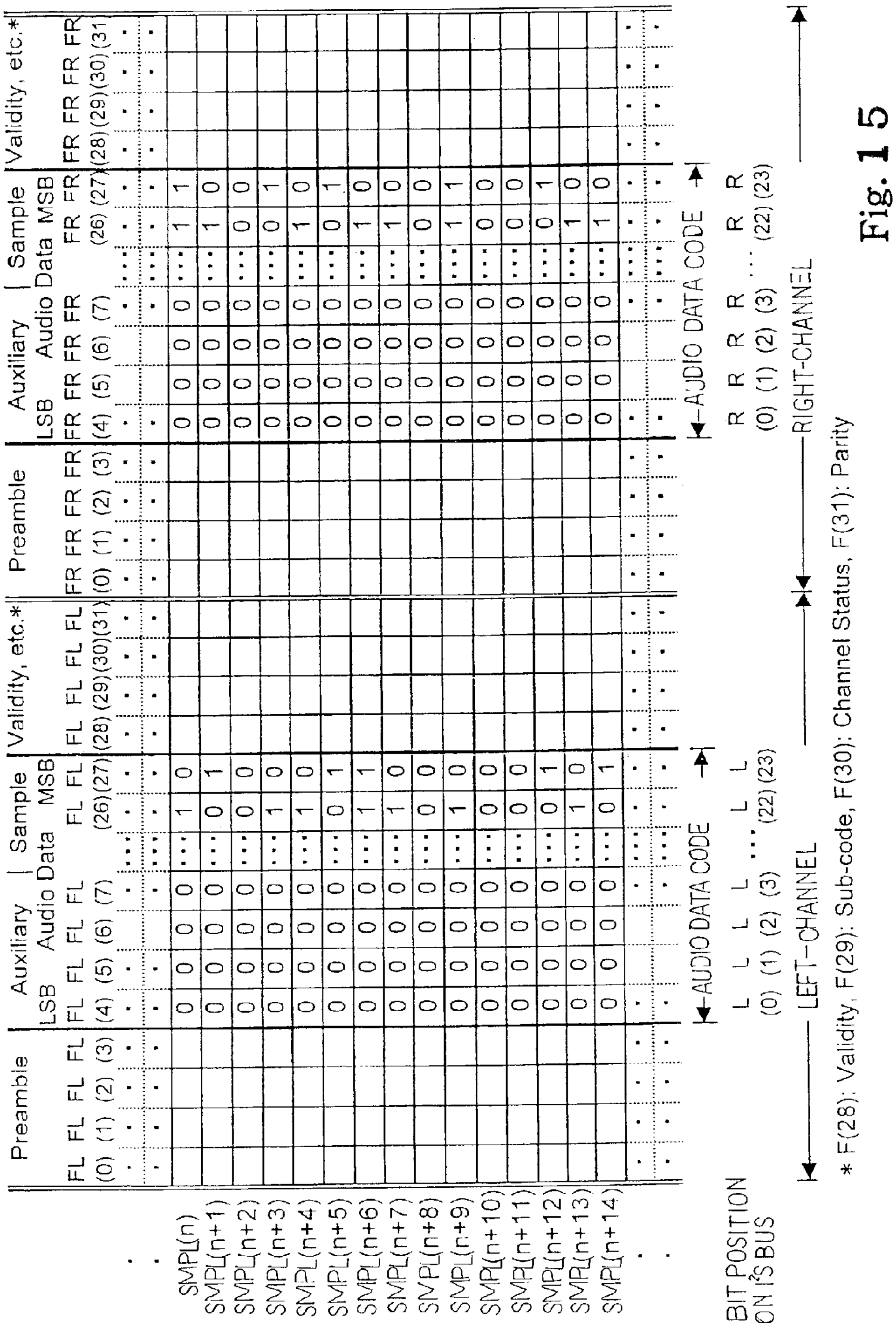
FIG. 15 is a view showing sub-frames to be transmitted through an S/F DIF interface.

The S/P DIF output unit 29 is designed on the basis of the EIAJ Digital Audio Interface Standard CP-1201. According to the EIAJ Digital Audio Interface Standard, a “sub-frame” is used for transferring a single word of audio data code. The sub-frames are formatted as shown in FIG. 15. Each sub-frame has 32 bits. The audio data code SMPL(n) for the left channel and audio data code SMPL(n) for the right channel are assigned to a pair of sub-frames. Each of the 24-bit audio data codes is sandwiched between the preamble code FL(0)–FL(3) and the control data code FL(28)–FL(31). However, the bit string of the preamble code and the bit string of the control data code are not shown in FIG. 15 for the sake of simplicity. The sub-frame is transmitted from the bit FL(0)/FR(0) to the bit FL(31)/FR(31).

The preamble code FL(0)–FL(3) or FR(0)–FR(3) is a sign to receive an audio data code, and makes the receiver to discriminate the channels from each other. The next data field consisting of the bits FL(4)–FL(27) or FR(0)–FR(27) is divided into two parts "Auxiliary" and "Sample". The user has an option to arbitrarily change the data sub-field Auxiliary. However, the subdata field Sample is assigned to the audio data code. The control data code includes the bits FL(28)/FR(28), FL(29)/FR(29), FL(30)/FR(30) and FL(31)/FR(31), and the bits FL(28)/FR(28), FL(29)/FR(29), FL(30)/FR(30) and FL(31)/FR(31) represent the validity, sub-code, channel status and parity, respectively. In the data transmission to the tone generator module 12, both of the data sub-fields Auxiliary and Sample are assigned to the 24-bit extended audio data codes.

The sub-frame is transmitted from the least significant bit toward the most significant bit through the S/P DIF interface. For this reason, the data bits at the bit positions L(23)–L(0) are respectively stored at FL(27)–FR(4), and the data bits at the bit positions R(23)–R(0) are stored at FR(27)–FR(4), respectively. The S/P DIF interface is available for audio data codes sampled at 48 kHz, 44.1 kHz or 32 kHz.

The S/P DIF output unit 29 includes the data processor and the BMC modulator as described hereinbefore. The BMC modulator modulates the sub-frames to the digital modulated music data signal through the BMC (Bi-phase Mark Code) modulation technique, and outputs the digital modulated music data signal to the digital audio cable 17. The BMC modulation makes the receiver synchronized with the transmitter.

Figure 16:
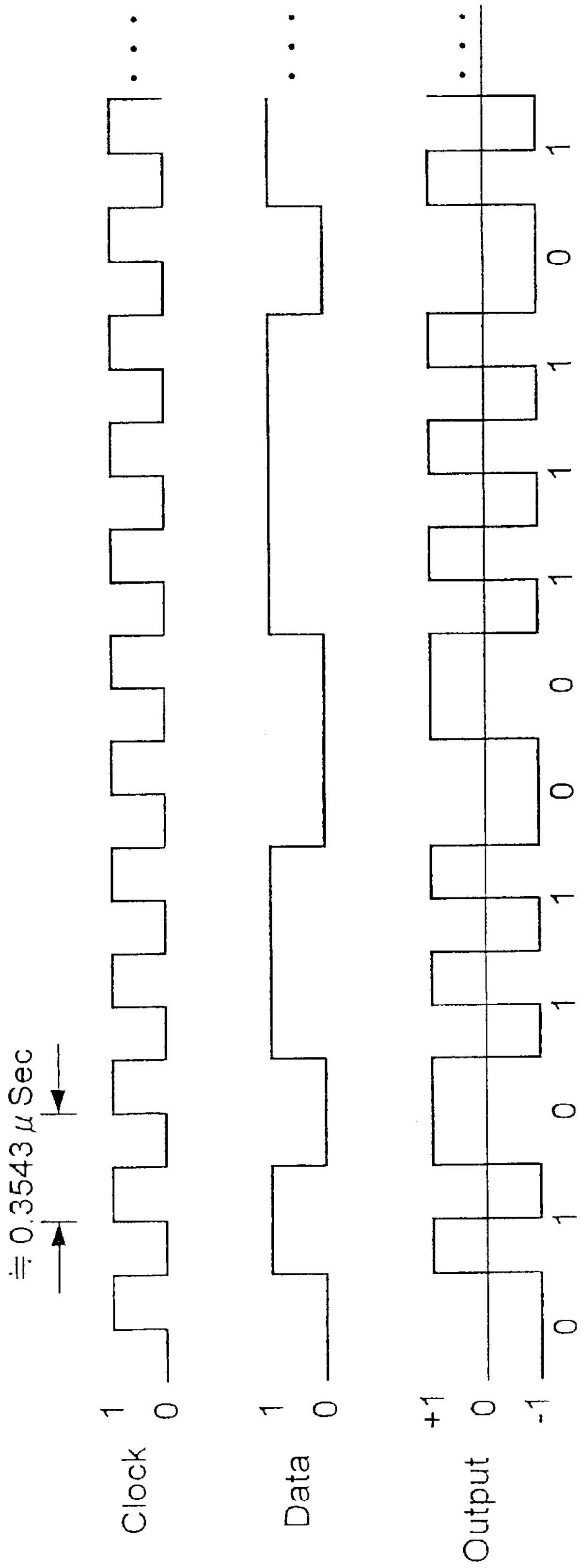
FIG. 16 is a timing chart showing a bi-phase mark code modulation.

FIG. 16 shows the BMC modulation. The data processor supplies the clock signal Clock, the pulse period of which is of the order of 0.3543 microsecond, to the BMC modulator, and a bit string Data of a sub-frame is modulated to a bit string Output of the digital modulated music data signal. The bit string Output is "010110011101 . . . ". When the data bit to be transmitted is "0", the BMC modulator reciprocally changes the potential level between "−1" and "+1" in a single pulse period, i.e., from "−1" through "+1" to "−1" or from "+1" through "−1" to "+1". On the other hand, if the data bit to be transmitted is "1", the BMC modulator changes the potential level between "−1" and "+1" once and a half in the single pulse period, i.e., "−1", "+1", "−1" and "+1" or "+1", "−1", "+1" and "−1". Thus, the digital modulated music data signal changes the potential level in a time period equal to the pulse period or a time period equal to the half of the pulse period. While the tone generator module 12 is receiving the digital modulated music data signal, the tone generator module 12 reproduces the clock signal Clock from the digital modulated music data signal.

In this instance, the audio data codes were produced through the sampling at 44.1 kHz; although the S/F DIF interface is available for the data transmission through a monophonic mode, i.e., a single channel, each pair of sub-frames is assigned to the audio data code for the left channel and the audio data code for the right channel. In other words, the 64-bit frame, a pair of sub-frames is to be transmitted to the tone generator module 12 in 1/44100 second. For this reason, the clock signal is calculated as $$(1/44100)/(32\times2)\times1000000=0.3543 \text{ microsecond}$$

Turning back to FIG. 9, the digital audio cable 17 is terminated at the S/P DIF input unit 44. The S/P DIF input unit 44 reproduces the clock signal Clock, and demodulates the digital modulated music data signal to composite music data codes, which are equivalent to the audio data codes output from the multiplexer 28. The digital demodulated music data signal, which contains the composite music data codes, is transmitted through the $I^2$Sdata bus system 12*d* to the MIDI data separator 45 and the mixer 48.

Demultiplexing

The MIDI data separator 45 is operative to extract the MIDI data bits from the composite music data codes and restore the extracted MIDI data bits to the MIDI words. The MIDI data separator 45 supplies the MIDI words to the MIDI output unit 47. The MIDI data separator 45 includes a microprocessor for demultiplexing, another data processor for a data transmission and a memory system, which contains a main memory and a MIDI data transmission memory. When the microprocessor for demultiplexing starts to run on a computer program for the separation of MIDI data bits from the composite music data codes, i.e., demultiplexing, the microprocessor defines the followings in the main memory and MIDI data transmission memory. A flag FG3, another flag FG4, a sample reception register RG5, a sample reception status ST5, a MIDI reception container CTN6 and a MIDI reception status ST6 are defined in the main memory, and a MIDI transmission buffer BF4 and a MIDI transmission counter CT4 are defined in the MIDI data transmission memory.

The flag FG3 is assigned to the previous potential level of the clock signal WS, and the other flag FG4 is assigned to the present potential level of the clock signal WS. The microprocessor sets the flags FG3/FG4 for "1" in the initialization.

The sample reception register RG5 is assigned to the data bit SD of the digital demodulated music data signal, i.e., the output data bit from the S/P DIF input unit 44, and the sample reception status ST5 is a pointer indicative of the bit position of the data bit SD stored in the sample reception register RG5. The microprocessor sets the sample reception status ST5 for "0" in the initialization.

The MIDI reception container CTN6 is assigned to the restored MIDI word, and the MIDI reception status ST6 is a pointer indicative of the bit position in the MIDI reception container CTN6. The data bit separated from the composite music data code is stored in the bit position indicated by the MIDI reception status ST6. The microprocessor sets the MIDI reception status ST6 for "0" in the initialization.

The MIDI transmission buffer BF4 is assigned to the MIDI words to be transmitted to the tone generator 46 and MIDI output 47, and the MIDI transmission counter CT4 is indicative of the number of MIDI words stored in the MIDI transmission buffer BF4. The microprocessor sets the MIDI transmission counter CT4 for zero in the initialization.

Figure 17:
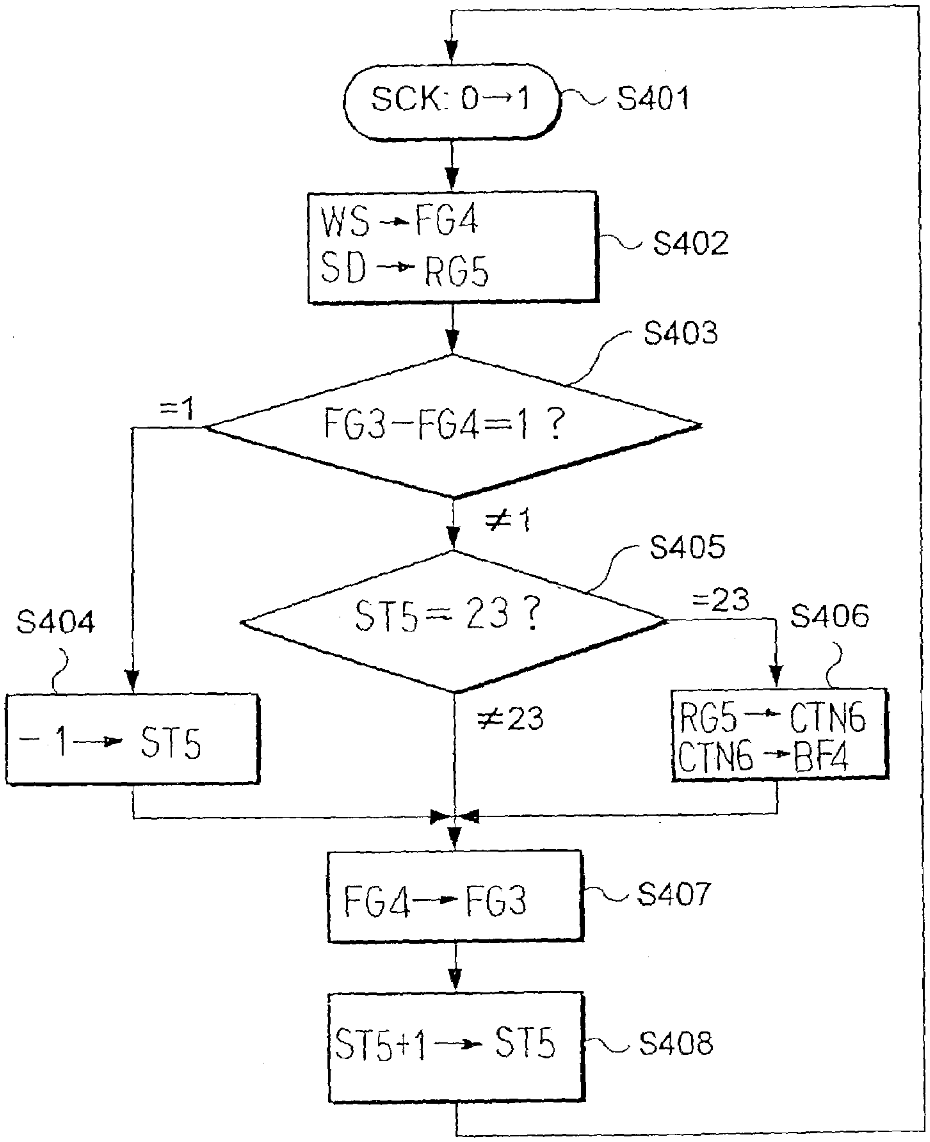
FIG. 17 is a flowchart showing a computer program for extracting the MIDI words.

The clock generator 51 supplies the clock signals SCK and WS to the MIDI data separator 45, and the microprocessor stores the data bit on the $I^2$S bus system 12*d* in the sample reception register RG5 synchronously with the clock signal SCK. The microprocessor restores the MIDI data bits to the MIDI words through the execution of the computer program shown in FIG. 17, and description is made on the computer program with reference to FIG. 17.

The clock signal SCK is assumed to change the potential level from "0" to "1". The microprocessor acknowledges the potential change of the clock signal SCK as by step S401, and stores the potential level of the clock signal WS and the data bit SD on the $I^2$S bus system 12*d* in the flag FG4 and the sample reception register RG5, respectively, as by step S402.

Subsequently, the microprocessor calculates the difference between the value stored in the flag FG4 and the value stored in the flag FG3, i.e., FG3–FIG. 4 as by step S403. As described with reference to FIG. 13, the clocks signal WS changes the potential level immediately from "1" to "0" before the data transmission of the least significant bit R(0) of each composite music data code. For this reason, when the least significant bit R(0) is stored in the sample reception register RG5 at step S402, the difference is equal to 1, and the microprocessor sets the sample reception status for "−1" as by step S404.

Subsequently, the microprocessor makes the flag 3 equal to the flag FG4 as by step S407, and increments the sample reception status ST5 by one as by step S408. The microprocessor waits for the potential change of the clock signal SCK.

The microprocessor acknowledges the potential change from "0" to "1" at step S401, again, and stores the potential level of the clock signal WS and the data bit SD on the $I^2S$ bus system 12*d* in the flag FG4 and the sample reception register RG5 at step S402. The microprocessor calculates the difference between the value of the flag FG3 and the value of the other flag fg4 at step S403, and finds the difference between "FG3–FG4" to be zero. Then, the microprocessor proceeds to step S405, and checks the sample reception status ST5 to see whether or not the value is 23. The sample reception status ST5 was presently "0" so that the microprocessor proceeds to step S407. The microprocessor transfers the value from the flag FG4 to the flag FG3 at step S407, and increments the sample reception status ST5 by one at step S408. The microprocessor waits for the potential change of the clock signal SCK. Thus, the microprocessor reiterates the loop consisting of steps S401–S403, S405 and S407–S408 until the sample reception status ST5 reaches "23". Although the data bits R(0), L(23) to L(1) successively reaches the sample reception register RG5, the MIDI data separator 45 ignores these data bits R(0) and L(23) to L(1).

The clock signal SCK changes the potential level from zero to "1" after the sample reception status ST5 was increased to "23". Then, the microprocessor respectively stores the potential level of the clock signal WS and the data bit L(0) in the flag FG4 and the sample reception register RG5 at step S402, and proceeds through step S403 to step S405. The microprocessor finds the sample reception status ST5 to be "23", and proceeds to step S406. The microprocessor achieves jobs analogous to those at steps S203 to S211 in FIG. 12. The microprocessor transfers the data bit L(0) from the sample reception register RG5 to the MIDI reception container CTN6, and stores the data bit L(0) in the bit position indicated by the MIDI reception status ST6. The microprocessor increments the MIDI reception status ST6 by one, and proceeds to step S407. The microprocessor continues to repeat the loop consisting of steps S401 to S403, S405, S407 and S408. However, the data bits R(23) to R(1) are ignored. The clock signal WS changes the potential level from "1" to zero after the data bit R(1), again.

The microprocessor reiterates the loop consisting of steps S401 to S408, and only the data bits L(0) are accumulated in the MIDI reception container CTN6 at steps S406. The step S406 is repeated ten times, and the data bits L(0) are restored to a MIDI word. Then, microprocessor transfers the MIDI word from the MIDI reception container CTN6 to the MIDI transmission buffer BF4, and increments the MIDI transmission counter CT4 by one. Thus, the microprocessor extracts the data bits L(0) from the digital demodulated music data signal, and restores the MIDI data bits to the MIDI words.

Transmission to Tone Generator/MIDI Output

While the microprocessor for demultiplexing is restoring the MIDI data bits to the MIDI words, another microprocessor for the data transmission transmits the MIDI words from the MIDI transmission buffer BF4 to the tone generator 46 and MIDI output unit 47. Although two microprocessors are incorporated in the MIDI data separator 45 for the demultiplexing and data transmission in this instance, a single microprocessor may achieves both tasks in a time sharing fashion. The data transmission from the MIDI data separator 45 to the tone generator/MIDI output unit 46/47 is similar to data transmission from the electronic piano 24 to the tone generator/mixer 26/27 through the computer program shown in FIG. 10, and no further description is hereinafter incorporated for avoiding undesirable repetition.

Data Transmission to External Instrument

The MIDI output unit 47 transmits the MIDI music data codes through the MIDI cable to the external electronic musical instrument. The transmission rate is 31259 bps as defined in the MIDI standards.

The MIDI output unit 47 receives the MIDI music data codes from the MIDI data separator 45 through a computer program similar to the computer program executed in the MIDI receiver of the multiplexer 28 (see FIG. 12), and transmits the MIDI music data codes to the external electronic musical instrument through a computer program similar to that executed by the MIDI transmitter of the electronic piano 24 (see FIG. 10). In order to achieve those tasks, the MIDI output unit 47 has two microprocessors. However, a single microprocessor may execute those computer programs in a time sharing fashion. Although the microprocessor receives the MIDI music data codes synchronously with the clock signal SCK, the microprocessor internally produces the clock signal, the pulse period of which is 32.00 microsecond, and the MIDI music data codes are transmitted to the external electronic musical instrument synchronously with the internally produced clock signal. Thus, the MIDI output unit 47 transmits the MIDI music data codes at the transmission rate defined in the MIDI standards.

Generation of Electronic/Electric Tones

The MIDI music data codes are transferred to the tone generator 46. The tone generator 46 includes a waveform memory, a key assigner and plural data read-out channels. The event codes intermittently arrive at the key assigner, and the key assigner selectively assigns the note-on event codes to the plural data read-out channels. The data read-out channels accesses the waveform memory in parallel, and read out pieces of waveform data from the waveform memory. The data read-out channels produce digital audio signals, and the digital audio signals are mixed into a single digital audio signal. As described hereinbefore, the S/P DIF input unit 44 supplies the digital demodulated music data signal to the mixer 48, and the digital demodulated music data signal is mixed with the digital audio signal.

The digital audio signal is supplied from the mixer 48 to the line output unit 50. The line output unit 50 separates the digital audio signal into a digital audio signal for the left channel and another digital audio signal for the right channel, and converts the digital audio signals to an analog audio signal for the left channel and another analog audio signal for the right channel. The analog audio signals are supplied to the amplifier 13 (see FIG. 1), and are increased in magnitude from the line level to the speaker level. The analog audio signals are supplied from the amplifier 13 to the loud speakers 14 and 15, and are converted to the electronic/electric tones through the loud speakers 14 and 15. Thus, the user performs the pieces of music in ensemble with the compact disc player 11*a*.

Playback of Ensemble

The user is assumed to give a recording instruction through the manipulating panel 42 to the controller 41.

While the mixer 48 is outputting the digital audio signal, the digital audio signal is sequentially stored in the memory 49 under supervision of the controller 41.

After the recording, the user is assumed to give an instruction through the manipulating panel 42 to the controller 41 for the playback. The controller 41 successively reads out the digital audio signal from the memory 49, and the read-out digital audio signal is transferred from the memory 49 to the MIDI data separator 45. The MIDI data separator 45 extracts the MIDI words from the digital audio signal, and supplies the MIDI music data codes to the MIDI output unit 47. The MIDI output unit 47 transmits the MIDI music data codes to the external electronic musical instrument.

The user can give instructions to the tone generator module 12 through the manipulating panel 22. In detail, the user can instruct the controller 21 to send a system exclusive message through the manipulating panel 22. The system exclusive message is a sort of the MIDI message, and manufacturers can arbitrarily define the system exclusive messages. In other words, the system exclusive message may be different between the electronic musical instruments sold by different manufacturers.

The controller 21 is assumed to receive the user's instruction to send the system exclusive message. The controller 21 produces a digital code representative of the system exclusive message, and transfers the digital code to the MIDI reception buffer BF2 of the multiplexer 28 through the execution of the computer program shown in FIG. 10. The multiplexer 28 receives the digital code, and stores it in the MIDI reception buffer BF2 through the execution of the computer program shown in FIG. 12. The multiplexer 28 multiplexes the digital code and audio data codes into the digital composite music data signal as similar to the event codes through the execution of the computer program shown in FIG. 14. The digital composite music data signal is modulated to the digital modulated music data signal, and the digital modulated music data signal is transmitted through the digital audio cable 17 to the tone generator module 12. The S/P DIF input unit 44 demodulates the digital modulated music data signal, and, thereafter, the MIDI data separator 45 extracts the digital code representative of the system exclusive message through the execution of the computer program shown in FIG. 17. The MIDI data separator 45 transfers the digital code to the controller 41, and the controller 41 achieves the jobs given through the system exclusive message. Thus, the user can give his or her instructions to the tone generator module 12 through the manipulating panel 22.

Figure 18:
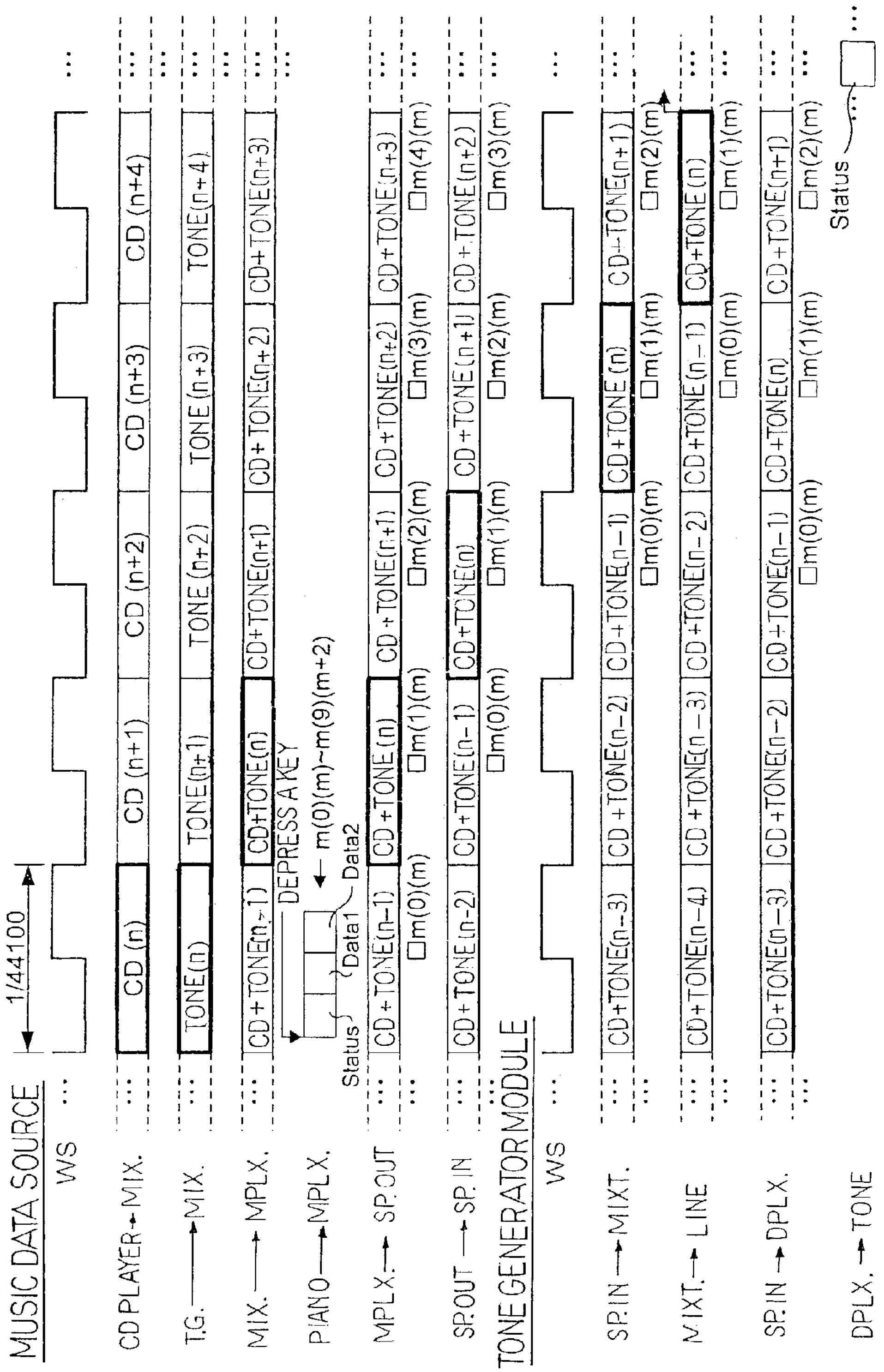
FIGS. 18 and 19 are timing chart showing the allover system behavior of the electronic musical instrument.
Figure 19:
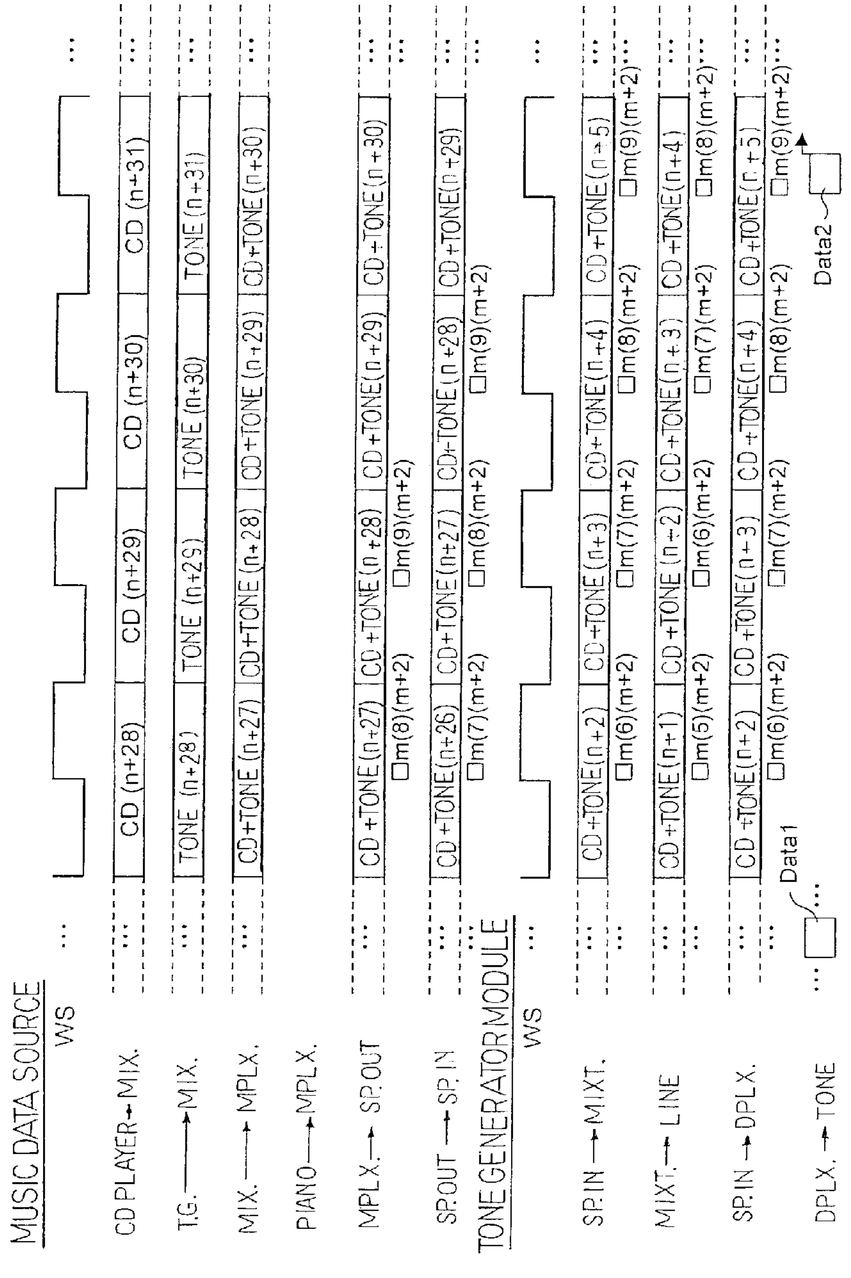

FIGS. 18 and 19 show the allover system behavior of the electronic musical instrument. Although the clock WS is synchronized between the music data source 11 and the tone generator module 12 in FIGS. 18 and 19, the synchronization is not required for the performance. Nevertheless, it is possible to establish the synchronization in both of the music data source 11 and the tone generator module 12 as follows. As described hereinbefore, the S/P DIF input unit 44 extracts the clock signal Clock from the digital modulated music data signal. The S/P DIF input unit 44 may supply the extracted clock signal Clock to the clock generator 51. The clock generator 51 makes the clock signals synchronous with the clock signal Clock. Then, the music data source 11 and tone generator module 12 are established in the synchronization.

In the figures, "MIX.", "T.G.", "MPLX.", "PIANO", "SP. OUT", "SP. IN", "MIXT.", "LINE", "DPLX." and "TONE" stand for the mixer 27, tone generator 26, multiplexer 28, electronic piano 24, S/P DIF output unit 29, S/P DIF input unit 44, mixer 48, line output unit 50, MIDI data separator 45 and tone generator 46, respectively. The audio data codes are represented by "CD(n)" to "CD(n+4)", and the digital audio signal, which the tone generator 26 produced on the basis of the MIDI music data codes, are expressed as "TONE(n)" to "TONE (n+4)". When a key is depressed, the electronic piano 24 produces the note-on event code containing the status byte Status and data bytes Data 1/Data 2. The multiplexer 28 replaces the least significant bits L(0) with the MIDI data bits m(0)m, m(1)m, m(2)m, m(3)m and m(4)m so that the composite music data code "CD +TONE (n−1)/m(0)(m)" to "CD+TONE (n+3)/m(4)(m)" are supplied to the S/P DIF output unit 29.

Focusing our attention to "CD(n)" and "TONE (n)", the mixer 27 introduces a time lug equal to a single pulse period (1/44100) for the mixing, and the S/P DIF output unit 29 introduces a time lug also equal to the single pulse period for the modulation. Thus, the music data source 11 introduces the time lug twice as long as the pulse period into the propagation to the digital audio cable 17.

In the tone generator module 12, the S/P DIF input unit introduces a time lug equal to the single pulse period for the demodulation, and the mixer 48 introduces a time lug equal to the single pulse period for the mixing. The total time lug between the transmission from the CD player/tone generator 25/26 to the line output unit 50 is five times longer than the pulse period, i.e., 5/44100 second.

On the other hand, when the user depresses the key 24*a*, the electronic piano 24 produces the note-on message represented by the three MIDI words (see FIG. 6), and the transmits the MIDI words to the multiplexer 28. The multiplexer 28 replaces the least significant bits L(0) with the MIDI data bits at each timing at which the clock signal WS change the potential level from zero to "1", and supplies the pairs of sub-frames to the S/P DIF output unit 29. The S/P output unit 29 modulates the sub-frames to the digital modulated music data signal, and transmits the digital modulated music data signal through the digital audio cable 17 to the tone generator module 12. The tone generator module 12 receives the digital modulated music data signal at the S/P DIF input unit 44, and demodulates it to the pairs of sub-frames. The pairs of sub-frames are transferred from the S/P DIF input unit 44 to the MIDI data separator 45. A time lug equal to the single pulse period, 1/44100 second, is introduced into the transmission. The MIDI data separator 45 extracts the MIDI data bits from the frame at intervals of 1/44100 second. Every ten MIDI bits, i.e., MIDI word is transferred from the MIDI data separator 45 to the tone generator 46. When the third MIDO word Data2 arrives at the tone generator 46, the tone generator 46 gets to produce the digital audio signal on the basis of the note-on event code, and the sound system 16 converts the digital audio signal to the electronic tone. Thus, the electronic tone is generated after 32/44100 second, i.e., about 725.6 microsecond from the note-on event on the keyboard 24*a*. Nevertheless, the delay of 725.6 microsecond is shorter than the time period consumed by three MIDI words transmitted at 31250 bps,i.e., 960.0 microsecond. Thus, the delay is admittable. If both of the least significant bits L(0)/R(0) of each frame are replaced with the MIDI data bits, the delay is reduced to a half, and the data transmission rate is surely improved.

As will be appreciated from the foregoing description, the MIDI music data codes and audio data codes are multiplexed into the digital composite music data signal or a series of composite music data codes. The digital composite music data signal is transmitted through the single digital cable and stored in the memory. On the other hand, the MIDI music data codes are separated from the digital composite music data signal, and the electronic tones are generated on the basis of the MIDI music data codes. Thus, the MIDI music data codes are correlated with the audio music data codes in the single digital signal so that the data management is easy and simple without increase of cost.

Figure 20:
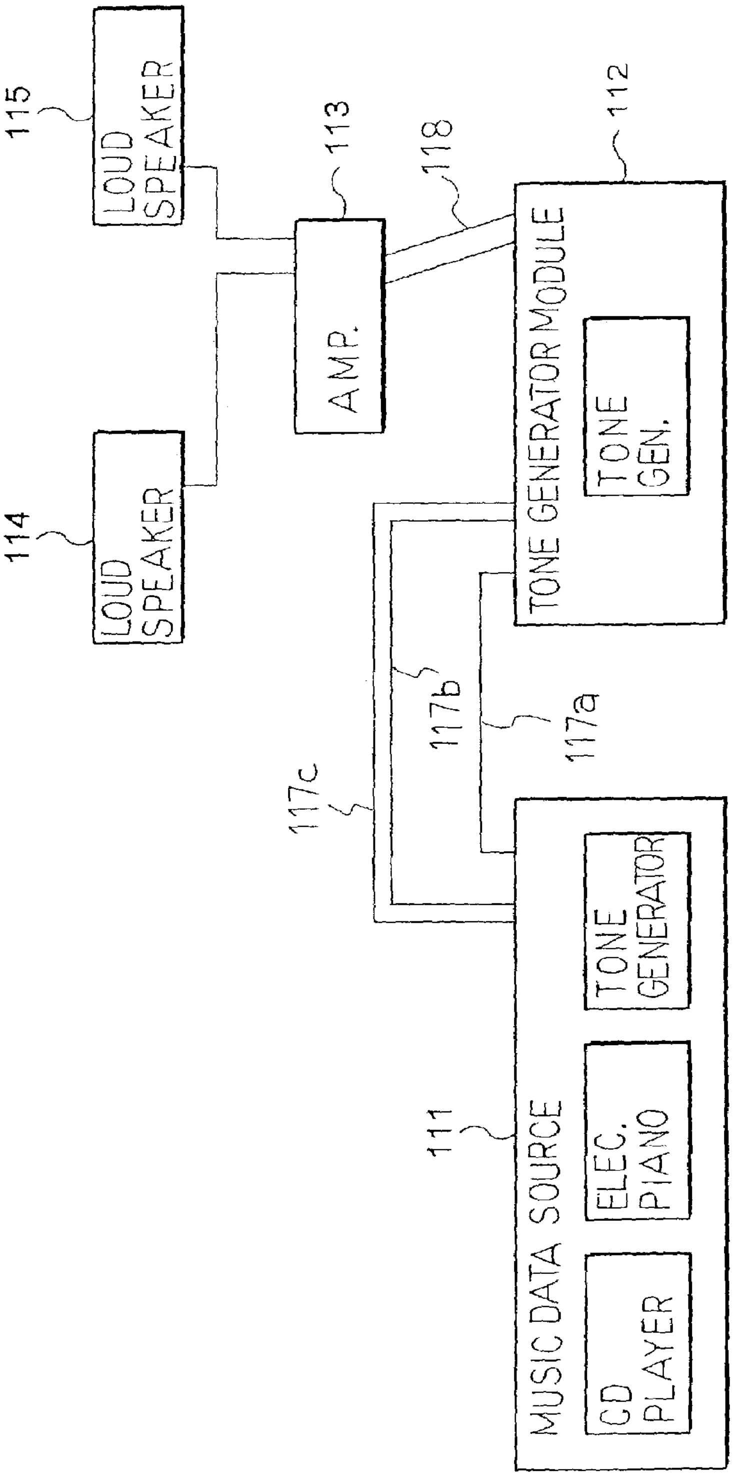
Fig. 20 PRIOR ART
FIG. 20 is a block diagram showing the system configuration of an electronic musical instrument imaged on the basis of the prior art technologies.

Even if the plural system components 11 and 12 are incorporated in the electronic musical instrument, the system component 11 is connected to the other system component 12 through the single cable 17. A corresponding prior art electronic musical instrument requires three cables 117*a*, 117*b* and 117*c* for electrically connecting a music data source 111 to a tone generator module 112 as shown in FIG. 20. The tone generator module 112 requires analog audio cables 118 for supplying the analog audio signals through an amplifier 113 to the loud speakers 114/115. Thus, the cables 117*a*, 117*b*, 117*c* and 118 are complicatedly connected among the system components 111, 112 and 113. Comparing FIG. 1 with FIG. 20, it is understood that the electronic musical instrument is advantageous over the corresponding prior art electronic musical instrument.

The electronic musical instrument according to the present invention is still open-ended. The electronic musical instrument can supply the MIDI music data codes from the MIDI output unit 47 to another electronic device and the analog audio signals from the line output unit 50 to yet another electric device. It is possible to output the digital audio signal and/or audio data codes through suitable interfaces to other electronic devices. Thus, the multiplexer 28/MIDI data separator 45 never make the electronic musical instrument closed-ended.

The MIDI data bits are not taken into the sub-codes, but into the sub-frames assigned the audio data codes. This results in that the MIDI data bits are easily multiplexed and demultiplexed.

Modifications

Although particular embodiments of the present invention have been shown and described, it will be apparent to those skilled in the art that various changes and modifications may be made without departing from the spirit and scope of the present invention.

For example, the compact disc player 11*a* does not set any limit on the technical scope of the present invention. The audio data codes may be stored in a magnetic disc through a private or public communication network. The audio data codes may be formatted differently from those shown in FIGS. 3 and 4. The audio data codes may be supplied from an external device to the electronic musical instrument through an S/P DIF interface.

The pulse width modulation does not set any limit on the technical scope of the present invention. Any modulation technology is available for digital audio codes representative of a piece of music.

The electronic piano 24 does not set any limit on the technical scope of the present invention. A music data source 11 may have a hard disc drive for storing a set of MIDI music data codes in a standard MIDI file. In this instance, the MIDI music data codes are intermittently supplied from the hard disc drive to the tone generator 26 and multiplexer 28.

The $I^2S$ data bus system and S/P DIF interface do not set any limit on the technical scope of the present invention. Any sort of bus system and any sort of interface are available for the electronic musical instrument according to the present invention in so far as the PCM data codes or a regulative bit string is transmitted therethrough.

Although the electronic musical instrument is separated into three system components 11/12/16, the system configuration does not set any limit on the technical scope of the present invention. Similarly, the system configuration of each system component 11/12/16 does not set any limit on the technical scope of the present invention. The S/P DIF input unit, MIDI data separator and line output unit may be incorporated in the music data source 11. Using the sound data source, the user can multiplexes and demultiplexes the audio data codes and MIDI data codes in the sound data source.

The digital audio cable 17 does not set any limit on the technical scope of the present invention. The music data source 11 may be connected to the tone generator module 12 through a local area network or internet. In this instance, the sound data source and tone generator module may have a sort of interface such as, for example, Ethernet.

The ensemble does not set any limit on the technical scope of the present invention. A set of MIDI music data codes stored in the standard MIDI file may be stored in an information storage medium together with the audio data codes for distributing the copies of the information storage medium.

In the above-described embodiment, the computer programs are stored in the memory systems incorporated in the electronic piano 24, multiplexer 28 and MIDI data separator 45. However, the computer programs may be stored in a compact disc or other sorts of information storage media for selling them in the market. The computer programs may be down loaded from a server computer to user's personal computers.

The audio data codes and MIDI music data codes do not set any limit on the technical scope of the present invention. Digital music data codes formatted differently from the audio data codes and MIDI music data codes may be multiplexed into a digital composite music data signal and demultiplexed from the digital composite music data signal.

In the above-described embodiment, the MIDI data separator 45 extracts the MIDI data bits from the sub-frames, and ignores the other audio data bits. However, another demultiplexer may separate the sub-frames into the MIDI data bits and audio data bits.

The system components of the embodiment are correlated with claim languages as follows. The electronic piano 24*a* serves as a first data source, and the compact disc driver 25 and mixer 27 as a whole constitute a second data source. The MIDI music data codes are corresponding to first music data codes, and the audio data codes serve as second music data codes. The multiplexer 28 and S/P DIF output unit 29 as a whole constitute a composite signal generator, and the S/P DIF output unit 29 serves as a transmitter.

The S/P DIF input unit 44 is corresponding to a receiver, and the MIDI data separator serves as a data separator. The tone generator 46, MIDI output unit 47, mixer 48 and line output unit 50 as a whole constitute a transmitter.

Steps S201–S211, S301–S305, S308, S309 and S311 are corresponding to a receiving step a) of a method for producing a digital composite music data signal, and steps SS301–S305, 310 and S311 serve as a monitoring step b). Step S306 is corresponding to a replacing step c) of the method, and steps S307 and S309 are corresponding to a transmitting step d).

Step S401 is corresponding to a receiving step a) of a method for separating first music data codes, and steps S402–S405, S407 and S408 serve as a monitoring step b) of the method. Step S406 is corresponding to both steps c) and d) of the method for separating first music data codes.

What is claimed is:

1. A multiplexing system for producing a digital composite music data signal from first music data codes formatted in accordance with a first standard and second music data codes formatted in accordance with a second standard different from said first standard, comprising:

a first data source outputting said first music data codes representative of a first sort of sound;

a second data source receiving said second music data codes representative of a second sort of sound, and producing a digital music signal containing said second music data codes;

a composite signal generator connected to said first data source and said second data source, receiving said first music data codes for storing first data bits thereof therein, and successively receiving said digital music signal for replacing second data bits occupying certain bit positions of said second music data codes with said first data bits for producing said digital composite music data signal; and a transmitter connected to said composite signal generator for outputting said digital composite music data signal.

2. The multiplexing system as set forth in claim 1, in which said first music data codes are representative of MIDI (Musical Instrument Digital Interface) messages, and said second music data codes respectively contain bit strings representative of discrete values on an analog audio signal.

3. The multiplexing system as set forth in claim 2, in which said digital music signal includes plural frames, and said second music data codes are selectively assigned said plural frames.

4. The multiplexing system as set forth in claim 3, in which each of said plural frames contains at least one extra data bit occupying at the certain bit position.

5. The multiplexing system as set forth in claim 1, in which said first data source is an electronic musical instrument responsive to a fingering of a player for producing said first music data codes.

6. The multiplexing system as set forth in claim 1, in which said second data source includes a music disc for storing pieces of music data, and a disc driver accessing said pieces of music data for producing said second music data codes.

7. The multiplexing system as set forth in claim 1, in which said transmitter is connected through a single digital audio cable to a demultiplexing system for producing at least one analog audio signal on the basis of said digital composite music data signal, and said at least one analog audio signal is supplied from said demultiplexing system to a sound system for generating said first sort of sound and said second sort of sound.

8. The multiplexing system as set forth in claim 7, in which said transmitter includes an interface defined in EIAJ (Electronic Industries Association of Japan) CP-1201 standard, and said interface is connected through said digital audio cable to a corresponding interface incorporated in said demultiplexing system.

9. A method for producing a digital composite music data signal from first music data codes formatted in accordance with a first standard and second music data codes formatted in accordance with a second standard different from said first standard, comprising the steps of:

a) receiving said first music data codes for storing first data bits therein and a digital music signal containing said second music data codes so as to selectively permits second data bits of said digital music signal to pass therethrough;

b) monitoring said digital music signal to see whether or not the second data bits occupying at certain bit positions of said second music data codes arrive there;

c) replacing said second data bits at said certain bit positions with said first data bits when the answer at said step b) is given affirmative, thereby producing said digital composite music data signal; and d) outputting said digital composite music data signal.

10. A computer program representing a method for producing a digital composite music data signal from first music data codes formatted in accordance with a first standard and second music data codes formatted in accordance with a second standard different from said first standard, said method comprising the steps of:

a) receiving said first music data codes for storing first data bits therein and a digital music signal containing said second music data codes so as to selectively permits second data bits of said digital music signal to pass therethrough;

b) monitoring said digital music signal to see whether or not the second data bits occupying at certain bit positions of said second music data codes arrive there;

c) replacing said second data bits at said certain bit positions with said first data bits when the answer at said step b) is given affirmative, thereby producing said digital composite music data signal; and d) outputting said digital composite music data signal.

11. An information storage medium for storing a computer program representing a method for producing a digital composite music data signal from first music data codes formatted in accordance with a first standard and second music data codes formatted in accordance with a second standard different from said first standard, said method comprising the steps of:

a) receiving said first music data codes for storing first data bits therein and a digital music signal containing said second music data codes so as to selectively permits second data bits of said digital music signal to pass therethrough;

b) monitoring said digital music signal to see whether or not the second data bits occupying at certain bit positions of said second music data codes arrive there;

c) replacing said second data bits at said certain bit positions with said first data bits when the answer at said step b) is given affirmative, thereby producing said digital composite music data signal; and d) outputting said digital composite music data signal.

12. A demultiplexing system for separating at least first music data codes formatted in accordance with a first standard from a digital composite music data signal containing said first music data codes and second music data codes formatted in accordance with a second standard different from said first standard, comprising:

a receiver receiving said digital composite music data signal;

a data separator connected to said receiver, monitoring said digital composite music data signal to see whether or not first data bits occupying certain bit positions of said second music data codes arrive thereat, and separating said first data bits from said digital composite music data signal for restoring said first data bits to said first music data codes when the answer is given affirmative; and a transmitter connected to at least said data separator for transmitting pieces of music data represented by said first music data codes to a destination.

13. The demultiplexing system as set forth in claim 12, in which said first music data codes are representative of MIDI (Musical Instrument Digital Interface) messages, and said second music data codes respectively contain bit strings representative of discrete values on an analog audio signal.

14. The demultiplexing system as set forth in claim 13, in which said digital composite music data signal includes plural frames, and said second music data codes are selectively assigned said plural frames.

15. The demultiplexing system as set forth in claim 14, in which each of said plural frames contains bit positions assigned to one of said bit strings and at least one of said certain bit positions occupied by one of said first data bits.

16. The demultiplexing system as set forth in claim 12, in which said transmitter includes a tone generator connected to said data separator and receiving said first music data codes for producing a digital audio signal on the basis of said first music data codes, a mixer connected to said tone generator and said receiver and mixing said digital audio signal and said digital composite music data signal into another digital audio signal, and an output circuit connected to said mixer and converting said another digital audio signal to at least one analog audio signal.

17. The demultiplexing system as set forth in claim 12, in which said transmitter includes an output unit connected to said separator for transmitting said first music data codes to a destination.

18. The demultiplexing system as set forth in claim 16, further comprising a memory connected to said transmitter for storing said digital audio signal therein and to said data separator for restoring said first data bits contained in said digital audio signal to said first music data codes.

19. A method for separating at least first music data codes formatted in accordance with a first standard from a digital composite music data signal containing said first music data codes and second music data codes formatted in accordance with a second standard different from said first standard, comprising:

a) receiving said digital composite music data signal;

b) monitoring said digital composite music data signal to see whether or not first data bits occupying certain bit positions of said second music data codes arrive;

c) separating said first data bits from said digital composite music data signal for restoring said first data bits to said first music data codes; and e) transmitting pieces of music data represented by said first music data codes to a destination.

20. A computer program representing a method for separating at least first music data codes formatted in accordance with a first standard from a digital composite music data signal containing said first music data codes and second music data codes formatted in accordance with a second standard different from said first standard, said method comprising:

a) receiving said digital composite music data signal;

b) monitoring said digital composite music data signal to see whether or not first data bits occupying certain bit positions of said second music data codes arrive;

c) separating said first data bits from said digital composite music data signal for restoring said first data bits to said first music data codes; and e) transmitting pieces of music data represented by said first music data codes to a destination.

21. An information storage medium for storing a computer program representing a method for separating at least first music data codes formatted in accordance with a first standard from a digital composite music data signal containing said first music data codes and second music data codes formatted in accordance with a second standard different from said first standard, said method comprising:

a) receiving said digital composite music data signal;

b) monitoring said digital composite music data signal to see whether or not first data bits occupying certain bit positions of said second music data codes arrive;

c) separating said first data bits from said digital composite music data signal for restoring said first data bits to said first music data codes; and e) transmitting pieces of music data represented by said first music data codes to a destination.

* * * * *